(12) United States Patent
Arazaki

(10) Patent No.: US 10,395,150 B2
(45) Date of Patent: Aug. 27, 2019

(54) PRINTING CONTROL APPARATUS, CONTROL METHOD OF PRINTING CONTROL APPARATUS, AND PROGRAM

(71) Applicant: SEIKO EPSON CORPORATION, Tokyo (JP)

(72) Inventor: Shinichi Arazaki, Fujimi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/046,872

(22) Filed: Jul. 26, 2018

(65) Prior Publication Data

US 2019/0034769 A1    Jan. 31, 2019

(30) Foreign Application Priority Data

Jul. 28, 2017    (JP) .................................. 2017-146228

(51) Int. Cl.
*G06K 15/00* (2006.01)
*G06K 15/02* (2006.01)

(52) U.S. Cl.
CPC ......... *G06K 15/401* (2013.01); *G06K 15/022* (2013.01); *G06K 15/407* (2013.01); *G06K 15/4065* (2013.01)

(58) Field of Classification Search
CPC . G06K 15/401; G06K 15/022; G06K 15/4065
See application file for complete search history.

(56) References Cited

U.S. PATENT DOCUMENTS

| | | | |
|---|---|---|---|
| 2005/0086448 A1* | 4/2005 | Anand | G06F 12/023 711/170 |
| 2009/0086270 A1* | 4/2009 | Miyazawa | G06F 3/122 358/1.15 |
| 2013/0278665 A1* | 10/2013 | Imamura | B41J 13/0009 347/16 |
| 2015/0036186 A1 | 2/2015 | Mikami | |

FOREIGN PATENT DOCUMENTS

JP    2015-29239 A    2/2015

* cited by examiner

*Primary Examiner* — Moustapha Diaby
(74) *Attorney, Agent, or Firm* — Workman Nydegger

(57) ABSTRACT

A printer control apparatus that controls a printer executing printing based on print data, includes: a printer storage unit having a printing SSD in which reading and writing are executed in a unit of pages; a writing unit that writes print data to the printing SSD; a reading unit that reads print data from the printing SSD; and a reading and writing control unit that controls erasing of the print data that have been printed from the printing SSD according to a read state of the reading unit and causes the writing unit to write the new print data.

10 Claims, 8 Drawing Sheets

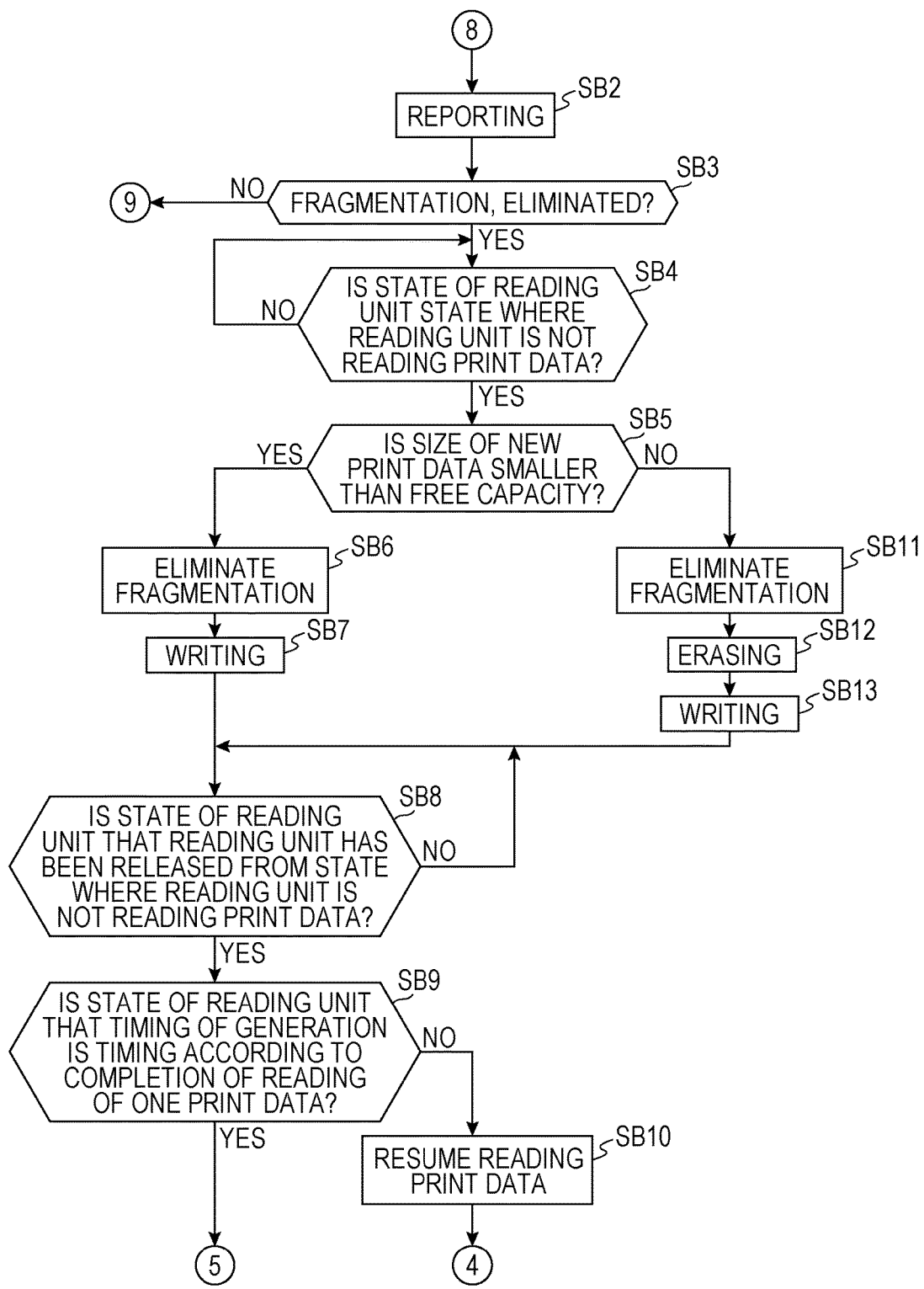

PRINTING CONTROL APPARATUS, CONTROL METHOD OF PRINTING CONTROL APPARATUS, AND PROGRAM

BACKGROUND

1. Technical Field

The present invention relates to a printing control apparatus, a control method of a printing control apparatus, and a program.

2. Related Art

In recent years, there is known a printing apparatus that writes data to a nonvolatile memory such as a Solid State Drive (SSD) and reads data from the nonvolatile memory (see, for example, JP-A-2015-29239).

By the way, there is a case where the printing apparatus may need to erase print data already written from the nonvolatile memory in order to write new print data. In this case, in the printing apparatus, a speed of reading the print data reduces, and a time required for printing increases.

SUMMARY

An advantage of some aspects of the invention is to suppress prolongation of the time required for printing.

According to an aspect of the invention, there is provided a printing control apparatus that controls a printing apparatus executing printing based on print data, including a storage unit having a nonvolatile memory in which reading and writing are executed in n cell units (n is 2 or more); a writing unit that writes the print data to the nonvolatile memory; a reading unit that reads the print data from the nonvolatile memory; and a control unit that controls erasing of the print data that have been printed from the nonvolatile memory according to a read state of the reading unit, and causes the writing unit to write new print data.

Accordingly, since the erasing of the print data that have been printed is controlled according to the read state of the reading unit and the new print data are written by the writing unit, it is possible to efficiently control erasing of the print data that have been printed from the nonvolatile memory, thereby suppressing prolongation of the time required for printing.

It is preferable that in the case where the reading unit is in a state that the reading unit is not reading the print data, the control unit erase the print data that have been printed from the nonvolatile memory, and causes the writing unit to write new print data.

Accordingly, since, in the case where the reading unit is in a state where the reading unit is not reading the print data, the print data that have been printed are erased and the new print data are written, it is possible to prevent a reduction in a reading speed of the print data caused by erasing of print data that have been printed, thereby suppressing prolongation of the time required for printing.

It is preferable that in a case where the reading unit is in a state where the reading unit is reading the print data, the control unit do not start erasing of the print data that have been printed from the nonvolatile memory.

Accordingly, since the erasing of print data and the reading of print data are not executed at the same time, it is possible to prevent a reduction in the reading speed of print data, thereby suppressing prolongation of the time required for printing.

It is preferable that a state in which the reading unit is not reading the print data be at least one of a state related to a cleaning operation in which the printing apparatus sucks ink from a nozzle, and a state related to a replacement of a rolled paper attachable and detachable to the printing apparatus.

Accordingly, since, in the case where a state of the printing apparatus is at least one of the state related to the cleaning operation and the state related to the replacement of a rolled paper, the print data that have been printed is erased from the nonvolatile memory, it is possible to suppress the prolongation of the time required for printing, and it is possible to efficiently execute erasing of the print data that have been printed by using a state generated at predetermined intervals in which the printing apparatus does not execute printing.

It is preferable that until there the writing unit is instructed to start writing new print data, the control unit erase the print data that have been printed from the nonvolatile memory in a case where there is received an erase command instructing to erase the print data from the nonvolatile memory, and in a case where the writing unit starts writing new print data and the size of the new print data is smaller than a free capacity of the nonvolatile memory, the control unit cause the writing unit to write the new print data without executing erasing of the print data that have been printed from the nonvolatile memory.

Accordingly, it is possible to further suppress prolongation of the time required for printing by erasing print data that have been printed in advance and promptly executing writing of new print data.

The printing control apparatus further includes a measuring unit that measures a cumulative amount of the print data written in the nonvolatile memory; and a reporting unit that reports information, in which the reporting unit reports information on a reduction in a printing speed of the printing apparatus in a case where the cumulative amount measured by the measuring unit is equal to or more than a predetermined amount.

Accordingly, since, in a case where the cumulative amount measured by the measuring unit is equal to or more than a predetermined amount, information on the reduction in the printing speed of the printing apparatus is reported, a user may recognize a reduction in the printing speed which may be caused by writing to the nonvolatile memory.

The printing control apparatus further includes an eliminating unit that eliminates fragmentation of the nonvolatile memory, and in a case where the cumulative amount measured by the measuring unit is equal to or more than a predetermined amount, the reporting unit reports information on fragmentation and in a case where the user issues an instruction to eliminate fragmentation, the eliminating unit eliminates fragmentation of the nonvolatile memory.

Accordingly, since in a case where the cumulative amount measured by the measuring unit is equal to or more than a predetermined amount, information on fragmentation is reported, and in the case where the user issues an instruction to eliminate fragmentation, the fragmentation of the nonvolatile memory is eliminated, the user may recognize fragmentation which may be caused by writing to the nonvolatile memory, and may eliminate a reduction in the reading speed of the print data caused by fragmentation.

It is preferable that the value of n be a value of the data size at which reading and writing are executable from the nonvolatile memory, and which be equal to or more than 8 Kbytes and less than 16 Kbytes.

Accordingly, since the data size that may be read and written at once is 8 Kbytes to 16 Kbytes, it is possible to read the print data more promptly than a hard disk, and by preventing a printing operation of the printing apparatus from being temporarily stopped because the reading of the print data required for printing may not be completed in time, it is possible to suppress deterioration of printing quality.

It is preferable that the printing control apparatus be provided on the printing apparatus including a printer unit executing printing based on the print data.

Accordingly, even if the printing control apparatus is provided in the printing apparatus, it is possible to control erasing of the print data that have been printed efficiently from the nonvolatile memory, thereby suppressing prolongation of the time required for printing.

According to another aspect of the invention, there is provided a control method of a printing control apparatus that controls a printing apparatus executing printing based on print data, including: a storage unit having a nonvolatile memory in which reading and writing are executed in n cell units (n is 2 or more); a writing unit that writes print data to the nonvolatile memory; and a reading unit that reads the print data from the nonvolatile memory, the method including: erasing the print data that have been printed from the nonvolatile memory according to a read state of the reading unit, and writing new print data by the writing unit.

Accordingly, since erasing of the print data that have been printed is controlled according to the read state of the reading unit, and the new print data are written by the writing unit, it is possible to control erasing of the print data that have been printed efficiently from the nonvolatile memory, thereby suppressing prolongation of the time required for printing.

According to still another aspect of the invention, there is provided a program executable by a control unit of a printing control apparatus that controls a printing apparatus executing printing based on print data, the printing control apparatus including a storage unit having a nonvolatile memory in which reading and writing are executed in n cell units (n is 2 or more), a writing unit that writes print data to the nonvolatile memory, and a reading unit that reads the print data from the nonvolatile memory, wherein the control unit controls erasing of the print data that have been printed from the nonvolatile memory according to the read state of the reading unit, and causes the writing unit to write new print data.

Accordingly, since erasing of the print data that have been printed is controlled according to the read state of the reading unit, and the new print data are written by the writing unit, it is possible to control erasing of the print data that have been printed efficiently from the nonvolatile memory, thereby suppressing prolongation of the time required for printing.

BRIEF DESCRIPTION OF THE DRAWINGS

The invention will be described with reference to the accompanying drawings, wherein like numbers reference like elements.

FIGS. 6A to 6C are flowcharts showing operations of the printer control apparatus.

DESCRIPTION OF EXEMPLARY EMBODIMENTS

Figure 1:
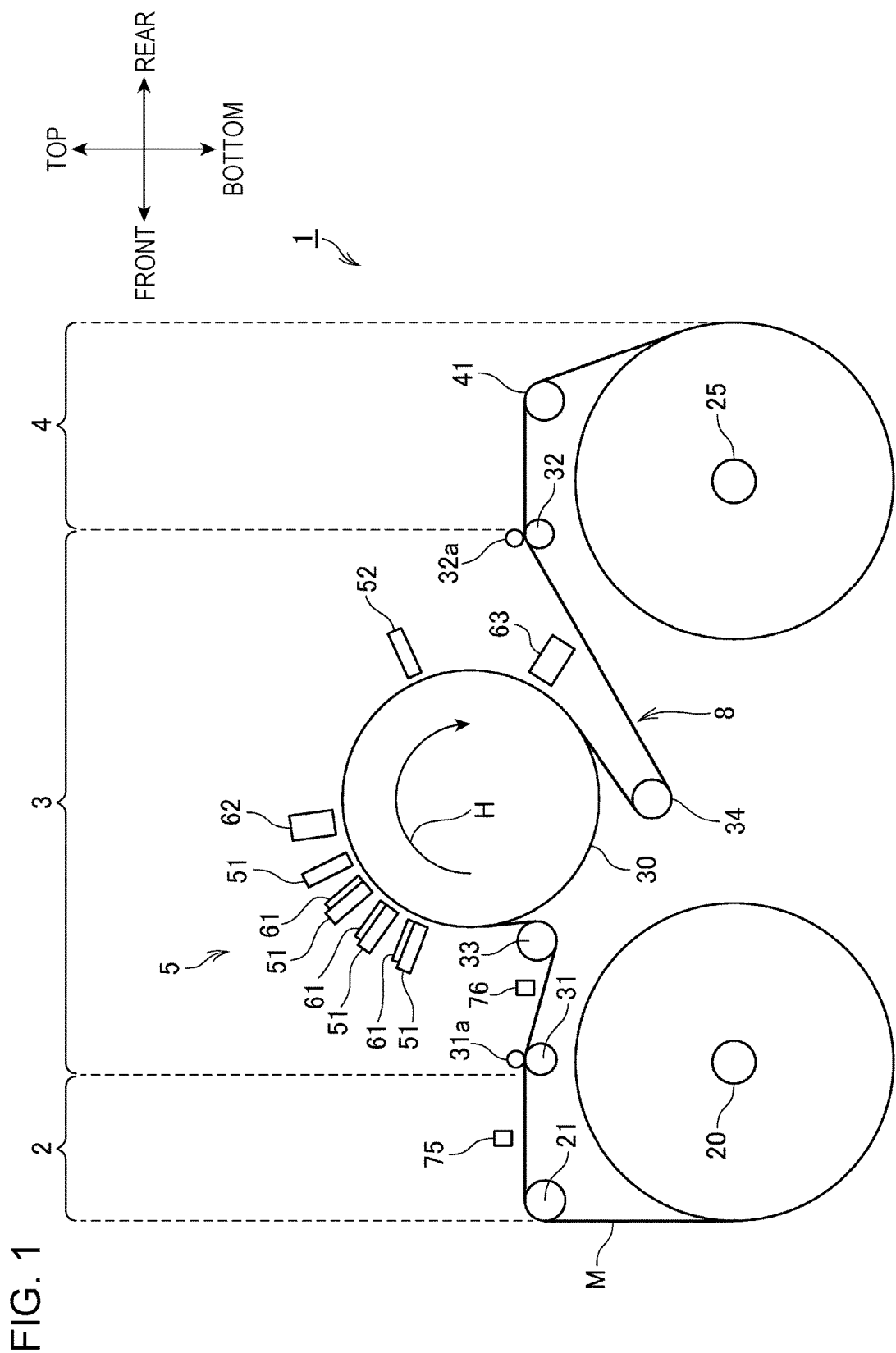
FIG. 1 is a diagram showing a configuration of the main portion of a printer.

FIG. 1 is a diagram showing a configuration of a main portion of a printer 1 (printing apparatus).

With reference to FIG. 1, in the description of a printing apparatus that performs printing while transporting a printing medium (a rolled paper) from an upstream side to a downstream side, as shown by the arrow, a leftward direction in the figure (a direction toward the upstream side in the direction of transporting the printing medium) is referred to as a "forward direction". A rightward direction in the figure (a direction toward the downstream side in the direction of transporting the printing medium) is referred to as a "backward direction". An upward direction in the figure (a direction opposite to the direction of gravity in a case where the printer 1 is installed) is referred to as an "upper direction". A downward direction in the figure (a direction of gravity in a case where the printer 1 is installed) is referred to as a "downward direction".

The printer 1 is an apparatus that prints characters, images, and the like on a printing medium, communicates with a host computer 200 (see FIG. 2), and executes printing based on the print data generated from the image data received from the host computer 200.

In the present embodiment, there is illustrated media M (rolled paper) wound in a roll shape as an example of a printing medium on which the printer 1 prints characters, images, and the like. In the following description, among faces of the media M, a face on the printed side (a side facing ink jet heads 51 and 52) is expressed as a front surface or a printing surface, and a face on a not-printed side is expressed as a back surface.

As shown in FIG. 1, the printer 1 includes a feeding unit 2 that feeds out the media M from a feeding shaft 20, a printer unit 3 that prints characters, images and the like on the media M fed out by the feeding unit 2, and a winding unit 4 that winds the printed media M printed by the printer unit 3 on a winding shaft 25.

The feeding unit 2 includes a feeding shaft 20 on which an end of the media M is wound, and a driven roller 21 on which the media M fed out from the feeding shaft 20 is wound. The feeding shaft 20 winds and supports the end of the media M in a state in which the front surface of the media M faces outward, that is, in a state in which the back surface of the media M and the driven roller 21 face each other. Since a feeding shaft 20 rotates clockwise in FIG. 1, the media M wound on the feeding shaft 20 is fed out toward the printer unit 3 through the driven roller 21. The media M is wound on the feeding shaft 20 through a core tube (not shown) attached to or detached from the feeding shaft 20. In a case where the media M of the feeding shaft 20 are used up, it is possible to replace the media M of the feeding shaft 20 by attaching a new core tube, on which roll-shaped media M is wound, to the feeding shaft 20. The feeding shaft 20 rotates by receiving a driving force from a motor (not shown) connected through a power transmission mechanism.

The printer unit 3 prints characters, images and the like on the media M using a printing unit 5 disposed along the outer peripheral surface of a platen drum 30, while the media M fed out from the feeding unit 2 is supported by the platen drum 30. The printing unit 5 will be described later. A front driving roller 31 is provided in front of the platen drum 30, and a rear driving roller 32 is provided behind the platen drum 30. The media M transported from the front driving roller 31 to the rear driving roller 32 is wound on and supported by the platen drum 30. The printer unit 3 ejects ink from the ink jet head 51 of the printing unit 5 toward a portion that is wound on the platen drum 30 of the media M, and prints characters, images and the like with the ink landed on the media M.

The front driving roller 31 has a plurality of minute protrusions formed by thermal spraying on the outer peripheral surface, and the media M fed out from the feeding unit 2 is wound from the back surface side. Since the front driving roller 31 rotates clockwise in FIG. 1, the media M fed out from the feeding unit 2 is transported to the downstream side in a transport direction H. A nip roller 31a for transporting the media M in cooperation with the front driving roller 31 is provided at a position facing the front driving roller 31. The nip roller 31a abuts against the front surface of the media M in a state of being forced toward the front driving roller 31 side, and the media M are interposed between the nip roller 31a and the front driving roller 31. As a result, the frictional force between the front driving roller 31 and the media M is secured, and the printer 1 may reliably transport the media M using the front driving roller 31.

The platen drum 30 is a cylindrical drum rotatably supported by a support mechanism (not shown). The platen drum 30 winds the media M from the back surface side, which is transported from the front driving roller 31 to the rear driving roller 32. The platen drum 30 supports the media M from the back surface side while the platen drum 30 rotates being driven in the transport direction H by the frictional force between the platen drum 30 and the media M.

The printer unit 3 is provided with a driven roller 33 and a driven roller 34 which folds back the media M on both sides of a winding portion to the platen drum 30. The driven roller 33 folds back the media M on the front surface of the media M between the front driving roller 31 and the platen drum 30. The driven roller 34 folds back the media M on the surface of the media M between the platen drum 30 and the rear driving roller 32. In this manner, by folding back the media M on the upstream side and the downstream side in the transport direction H with respect to the platen drum 30, it is possible to secure a long winding length of the media M on the platen drum 30.

The rear driving roller 32 has a plurality of minute protrusions formed by thermal spraying on the outer circumferential surface and winds the media M from the back surface side which is transported from the platen drum 30 through the driven roller 34. Since the rear driving roller 32 rotates clockwise in FIG. 1, the media M is transported to the winding unit 4. A nip roller 32a for transporting the media M in cooperation with the rear driving roller 32 is provided at a position facing the rear driving roller 32. The nip roller 32a abuts against the front surface of the media M in a state of being forced toward the rear driving roller 32 side and the media M are interposed between the nip roller 32a and the rear driving roller 32. As a result, the frictional force between the rear driving roller 32 and the media M is secured, and the printer 1 may reliably transport the media M using the rear driving roller 32.

In this manner, the media M transported from the front driving roller 31 to the rear driving roller 32 is supported on the outer peripheral surface of the platen drum 30. In the printer unit 3, there are provided a plurality of ink jet heads 51 of different colors of ink to be ejected in the printing unit 5, in order to print characters, images, and the like on the front surface of the media M supported by the platen drum 30. Each ink jet head 51 is positioned so as to face the front surface of the media M wound on the platen drum 30 with a predetermined gap therebetween and ejects ink of the corresponding color. Since each ink jet head 51 ejects ink to the media M transported in the transport direction H, the printer 1 prints characters, images, and the like on the front surface of the media M.

The plurality of ink jet heads 51 according to the embodiment are line type heads extending in a direction intersecting the transport direction H of the media M, and are heads corresponding to cyan (C), magenta (M), yellow (Y), and black (K), respectively. In the embodiment, ink to be ejected by each ink jet head 51 is Ultraviolet (UV) ink which is cured after being irradiated with ultraviolet rays. Therefore, the printing unit 5 is provided along the outer periphery of the platen drum 30 with a UV light source 61 and a UV light source 62 for curing the ink and fixing the ink on the media M.

In the embodiment, curing of the ink is executed in two stages of temporary curing and main curing of the ink. The temporary curing indicates that the surface of the ink is cured to such an extent that the ink ejected to the media M does not flow or blur from the media M. The main curing indicates that temporarily cured ink is completely cured to the inside of the ink after being irradiated with ultraviolet rays having a larger amount of light than the temporary curing. The UV light source 61 for temporary curing is disposed between the plurality of ink jet heads 51, and the ink ejected by each ink jet head 51 is temporarily cured by the UV light source 61. On the downstream side of the plurality of ink jet heads 51 in the transport direction H, a main curing UV light source 62 is disposed, and the ink ejected by each ink jet head 51 is fully cured by the UV light source 62.

As shown in FIG. 1, an ink jet head 52 is provided on the downstream side in the transport direction H of the UV light source 62. The ink jet head 52 is positioned so as to face the front surface of the media M wound on the platen drum 30 with a predetermined gap therebetween, and ejects transparent ink to the media M. This transparent ink is also UV ink. A UV light source 63 is provided on the downstream side in the transport direction H of the ink jet head 52. The UV light source 63 emits ultraviolet rays having a larger amount of light than the UV light source 61, and mainly cures the transparent ink ejected to the front surface of the media M by the ink jet head 52. As a result of this, the transparent ink is fixed to the media M.

In this manner, in the printer unit 3, the ink is appropriately ejected and cured to the media M wound on the outer periphery of the platen drum 30, and characters, images, and the like are printed on the media M. The printed media M are transported to the winding unit 4 by the rear driving roller 32.

In addition to the winding shaft 25 on which the end of the media M is wound, the winding unit 4 includes a driven roller 41 that winds the media M from the back surface side between the winding shaft 25 and the rear driving roller 32. The winding shaft 25 winds and supports the end of the media M in a state in which the front surface of the media M faces outward, that is, in a state in which the back surface of the media M and the driven roller 41 face each other. In a case where the winding shaft 25 rotates clockwise in FIG. 1, the media M transported from the rear driving roller 32 is wound on the winding shaft 25 through the driven roller 41. The media M is wound on the winding shaft 25 through a core tube (not shown) attached to or detached from the winding shaft 25. In a case where the media M wound on the winding shaft 25 becomes full, it is possible to remove the media M together with the core tube. That is, the media M together with the core tube is configured to be attachable to or detachable from the printer 1. The winding shaft 25 rotates by receiving a driving force from a motor (not shown) connected through a power transmission mechanism.

The printer 1 includes various kinds of sensors such as a tension sensor 74 (FIG. 2), an edge sensor 75, a mark sensor 76, and the like.

The tension sensor 74 is disposed, for example, in the driven roller 21, the driven roller 34, and the driven roller 41, respectively. The tension sensor 74 disposed on the driven roller 21 detects the tension of the media M from the feeding shaft 20 to the front driving roller 31 (that is, the tension of the media M), and outputs a detection result to the printer control unit 100 (FIG. 2) as described later. The printer control unit 100 controls the rotation of the feeding shaft 20 based on the input detection result and adjusts the tension of the media M from the feeding shaft 20 to the front driving roller 31. The tension sensor 74 disposed on the driven roller 34 detects the tension of the media M from the front driving roller 31 to the rear driving roller 32 and outputs a detection result to the printer control unit 100 as described later. The printer control unit 100 controls the rotation of the rear driving roller 32 based on the input detection result and adjusts the tension of the media M from the front driving roller 31 to the rear driving roller 32. The tension sensor 74 disposed on the driven roller 41 detects the tension of the media M from the rear driving roller 32 to the winding shaft 25 and outputs a detection result to the printer control unit 100 as described later. The printer control unit 100 controls the rotation of the winding shaft 25 based on the input detection result and adjusts the tension of the media M from the rear driving roller 32 to the winding shaft 25.

The edge sensor 75 is disposed between the driven roller 21 and the front driving roller 31. The edge sensor 75 is constituted with an ultrasonic sensor and the like, detects a position in a width direction (a direction intersecting the transport direction H) of the media M, and outputs a detection result to the printer control unit 100. The printer control unit 100 adjusts the position in the width direction of the media M based on the detection result, and prevents the media M from meandering while being transported in a transport path 8.

The mark sensor 76 is a sensor for detecting a mark possessed by the media M, and is constituted with, for example, a reflective optical sensor, and includes a light projector for projecting light onto the media M and a light receiver for receiving reflected light of the projected light. The light projector is constituted with a light emitting element for varying a projected light amount which is the light amount of light to be projected according to an applied voltage. The light receiver is constituted with a light receiving element for varying a voltage to be output according to the light amount of the received light. The mark sensor 76 detects a mark based on the result of light reception by the light receiver, and outputs a detection result to the printer control unit 100. The printer control unit 100 manages a position of the media M based on the detection result, and for example, the printer control unit 100 executes a start operation by setting a position of the media M to an appropriate position for starting printing not so as to generate an unnecessary margin in the media M at the time of starting printing.

Next, the functional configuration of the printer 1 will be described.

Figure 2:
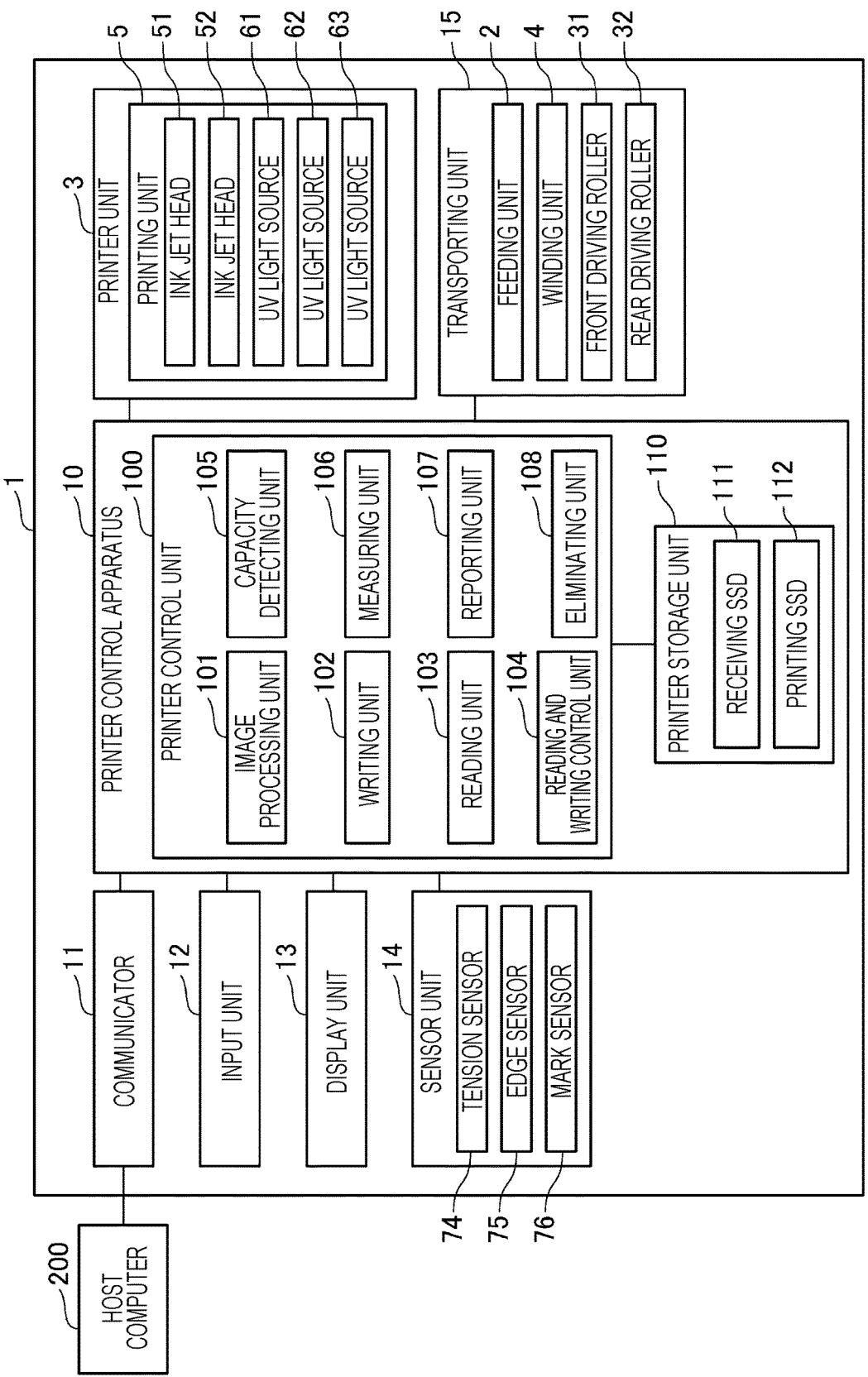
FIG. 2 is a diagram showing a functional configuration of the printer.

FIG. 2 is a diagram showing a functional configuration of the printer 1.

The printer 1 includes a printer control apparatus 10 (printing control apparatus), a communicator 11, an input unit 12, a display unit 13, a sensor unit 14, a printer unit 3, and a transporting unit 15.

The printer control apparatus 10 is an apparatus that controls each component of the printer 1, and includes a printer control unit 100 and a printer storage unit 110 (storage unit).

The printer control unit 100 includes a CPU, a ROM, a RAM, an ASIC, a signal processing circuit, and the like, and controls each component of the printer 1. In the printer control unit 100, for example, the CPU reads a program stored in a ROM, or a printer storage unit 110 and the like as described later into the RAM to executes processing, or for example, executes processing by a function implemented in an ASIC, or for example, executes processing in hardware and software by executing signal processing in a signal processing circuit, and the like. The printer control unit 100 includes, as functional blocks, an image processing unit 101, a writing unit 102, a reading unit 103, a reading and writing control unit 104 (control unit), a capacity detecting unit 105, a measuring unit 106, a reporting unit 107, and an eliminating unit 108. In these functional blocks, hardware such as a CPU executes processing in cooperation with hardware and software by reading a program stored in the printer storage unit 110, a ROM or the like to execute processing or the like. These functional blocks will be described later.

The printer storage unit 110 includes a nonvolatile memory such as a hard disk, an EEPROM, and a Solid State Drive (SSD), and stores various data in a rewritable manner. In particular, the printer storage unit 110 according to the embodiment includes a receiving SSD 111 and a printing SSD 112 (a nonvolatile memory). The receiving SSD 111 is an SSD that stores image data such as characters and images to be printed on the media M, which have been received from the host computer 200. The printing SSD 112 is an SSD that stores print data generated by performing processing on image data stored in the receiving SSD 111 by the image processing unit 101. The receiving SSD 111 and the printing SSD 112 are constituted with a NAND type SSD, and data are written and data are read in a unit called a "page", in which "cells" in the smallest unit of a storage element are grouped into the page having a size of equal to or more than 8 Kbytes (kilobytes) (the number of cells is 65536) and less than 16 Kbytes (the number of cells is 163968).

The communicator 11 communicates with the host computer 200 according to a predetermined communication standard under the control of the printer control unit 100.

The input unit 12 includes input means such as a touch panel, an operation switch provided in the printer 1, and detects an operation on the input means of the user and outputs the detected operation to the printer control unit 100. Based on an input from the input unit 12, the printer control unit 100 executes processing corresponding to the operation on the input means.

The display unit 13 includes a plurality of LEDs, a display panel, and the like, and executes turning on/off the LEDs in a predetermined manner, displaying information on the display panel, and the like under the control of the printer control unit 100.

The sensor unit 14 includes a tension sensor 74, an edge sensor 75, and a mark sensor 76. The sensor unit 14 outputs a detection result detected by these sensors to the printer control unit 100.

The printer unit 3 includes a printing unit 5 including an ink jet head 51, an ink jet head 52, a UV light source 61, a UV light source 62, and a UV light source 63; a driving circuit for driving the ink jet head 51 and the ink jet head 52; a driving circuit for driving the UV light source 61 to the UV light source 63; and other configuration related to printing on the printing medium.

The transporting unit 15 includes a feeding unit 2, a winding unit 4, a front driving roller 31, a rear driving roller 32, a motor that rotates the feeding shaft 20, a motor that rotates the winding shaft 25, a motor that rotates the front driving roller 31, a motor that rotates the rear driving roller 32, and other configuration related to transporting the printing medium.

Next, functional blocks provided in the printer control unit 100 will be described.

The image processing unit 101 executes various processing such as resolution conversion processing, color conversion processing, halftone processing, rasterization processing, command addition processing and the like on the image data stored in the receiving SSD 111 to generate print data. In the following description, data subjected to various processing based on the image data by the image processing unit 101 is also expressed as print data.

The resolution conversion processing is a process of converting the image data read from the receiving SSD 111 into print data of the set resolution. For example, in a case where the resolution of the print data is set to 600×600 dpi, the image processing unit 101 converts the image data of a vector format into print data in a bitmap format with a resolution of 600×600 dpi. The print data after resolution conversion processing is composed of pixel data indicating pixels arranged in a matrix. Each of pixel data is data having a gradation value of 256 gradations in an RGB color space, for example.

The color conversion processing is, for example, a process of converting print data in the RGB color space into print data in a CMYK color space. The CMYK colors are cyan (C), magenta (M), yellow (Y), and black (K), and the print data in the CMYK color space are data corresponding to colors of the ink possessed by the printer 1. Therefore, for example, in a case where the printer 1 uses four types of inks of a CMYK color system, the image processing unit 101 generates print data of the four-dimensional space of the CMYK color system based on the print data of the RGB color space. This color conversion processing is executed based on a table (so-called look-up table (LUT)) in which gradation values in the RGB color space are associated with gradation values in the CMYK color space. The print data after the color conversion processing are print data expressed in the CMYK color space.

The halftone processing is a process of converting print data of a large number of gradations (256 gradations) into print data of the number of gradations that may be formed by the printer 1. By this halftone processing, the print data indicating 256 gradations are converted into, for example, 1-bit print data indicating 2 gradations (with a dot or no dot) or 2-bits print data indicating 4 gradations (no dot, a small dot, a medium dot, a large dot), and the like. Specifically, from a dot generation rate table in which the gradation value (0 to 255) corresponds to a dot generation rate, a dot generation rate corresponding to a gradation value (for example, a dot generation rate corresponding to no dot, a small dot, a medium dot, and a large dot, respectively, in the case of four gradations) is obtained, and in the obtained generation rate, the print data are generated such that the dots are formed in a distributed manner based on algorithms such as the dither method and the error diffusion method.

The rasterization processing is a process of rearranging pixel data arranged in a matrix (for example, 1-bit or 2-bits data as described above) according to a dot formation order at the time of printing. The pixel data arranged in a matrix are allocated to actual nozzles forming each raster line constituting an image to be printed.

The command adding processing is a process of adding a command corresponding to a printing operation of the printer 1 to the print data subjected to the rasterization processing. As an example of the command, a command instructing to transport the media M, and the like (an amount of movement in the transport direction H, a speed thereof, and the like) may be mentioned.

The image processing unit 101 is not limited to a configuration that executes all of these various processing but, for example, may be configured to execute only the processing after the color conversion processing on the data in a case where the host computer 200 has executed up to the color conversion processing on the image data.

The writing unit 102 writes the print data generated by the image processing unit 101 into the printing SSD 112 in a unit called a "page" with respect to the printing SSD 112. For example, in a case where the printing SSD 112 is configured with at least an insulating film, a floating gate, and a tunnel oxide film, the writing unit 102 may write and hold data in the printing SSD 112 by passing electrons through the tunnel oxide film due to the application of a high voltage to the printing SSD 112 and storing the electrons in the floating gate, and in this configuration, it is possible to write and hold the print data in the printing SSD 112.

The reading unit 103 reads the print data written by the writing unit 102 in a unit called a "page" with respect to the printing SSD 112. For example, in a case where the printing SSD 112 is constituted with at least an insulating film, a floating gate, and a tunnel oxide film, the reading unit 103 reads the print data from the printing SSD 112 by determining whether a signal varying with the amount of electrons in the floating gate due to the application of a low voltage to the printing SSD 112 is 0 or 1. The print data read by the reading unit 103 is stored in a print buffer (not shown), and the printer control unit 100 executes printing based on the print data stored in a print buffer using the printer unit 3. Since the printing SSD 112 is a nonvolatile memory, the written print data are retained even if the power supply is cut off.

The reading and writing control unit 104 causes the writing unit 102 to write the print data into the printing SSD 112 and causes the reading unit 103 to read the print data from the printing SSD 112. The reading and writing control unit 104 erases the print data from the printing SSD 112 as described in detail later. For example, in a case where the printing SSD 112 is constituted with at least an insulating film, a floating gate, and a tunnel oxide film, the reading and writing control unit 104 erases the print data from the printing SSD 112 by discharging electrons from the floating gate due to the application of a voltage to the printing SSD 112 in a direction opposite to the writing.

The capacity detecting unit 105 detects a free capacity which is a capacity not storing data with respect to the printing SSD 112. For example, the capacity detecting unit 105 detects a free capacity based on the capacity storable in the printing SSD 112 and the size of the data written at the time of detecting. The detection of the free capacity by the capacity detecting unit 105 is not limited to the above method, and other methods may be adopted.

The measuring unit 106 has a function such as a counter and measures the cumulative amount of at least one of the size of the print data written by the writing unit 102 in the printing SSD 112 and the number of times of writing.

The reporting unit 107 reports various kinds of information by displaying various kinds of information on the display unit 13. The information reported by the reporting unit 107 is at least one of information on a reduction in the printing speed and information on fragmentation that may be generated in the printing SSD 112.

The eliminating unit 108 eliminates fragmentation that has been generated in the printing SSD 112, for example, by executing a garbage collection function. An existing method may be adopted as an elimination method of the eliminating unit 108.

By the way, the printer 1 according to the embodiment may execute printing on media M having a width of at least 13 inches or more in a direction intersecting a transport direction H, and the transporting speed during printing is 7.5 m (meters) per minute or more. The reason why the printer 1 is configured in this manner, is that, for example, the printer 1 is used by a printing company, and in this printing company, there are cases where many printings are executed in a short period of time for media M larger than a printing medium to be printed by a normal printer. In the embodiment, a normal printer indicates a printer that may execute printing on media having a width of less than 13 inches, and/or a printer having the transporting speed of less than 7.5 meters per minute.

In this type of printer 1, there is a need to continuously execute printing based on a plurality of print data so as to shorten a time required for a plurality of printing. To meet this need, the printer 1 may be configured to execute writing of print data into the printing SSD 112 using the writing unit 102 and reading of print data from the printing SSD 112 using the reading unit 103 at the same time. As a result, since the new print data are written in the printing SSD 112 after the printing based on one print data has been completed, the printer 1 may continuously execute a plurality of printing and may meet the above-mentioned needs.

In a case where new print data are written, in order to secure a capacity equal to or more than the size of new print data in the printing SSD 112, there is a case where it is necessary to erase already written print data. However, in a NAND type SSD, generally, in a case where erasing of data and reading of data are executed at the same time, a reading speed of data is reduced. Therefore, in the printing SSD 112, in a case where erasing of the print data and the reading of the print data are executed at the same time, there is a possibility of a reduction in the reading speed of the print data.

Here, erasing of data in a general NAND type SSD will be described.

In the NAND type SSD, erasing of data is executed in a unit of "blocks". The "block" is a collection of a plurality of "pages" indicating a unit in which writing of data and reading of data are executed. In a case where data to be erased and data not to be erased coexist in the block, in the NAND type SSD, first, the evacuation processing of the data not to be erased is executed. The evacuation processing of the data not to be erased indicates copying the data not to be erased which exists in the block for erasing data, to another block to which data are not written, or to a predetermined buffer.

In the NAND type SSD, in a case where the evacuation processing of the data not to be erased is executed, there are erased the data (the data to be erased and the data not to be erased) written in a block, to which the data to be erased is written. Subsequently, in the NAND type SSD, in a case where erasing of data is executed, the data not to be erased, which were copied in the evacuation processing, are written back to the block to which erasing of data has been executed.

In this manner, in the NAND type SSD, in a case where data to be erased and data to be erased coexist in the block, the evacuation processing is executed, and after the data to be erased have been erased, the data not to be erased is written back. Generally, in a NAND type SSD, in a case where reading of data and writing of data are executed at the same time, it is known that there is a possibility of a reduction in the reading speed of data. Therefore, in a case where the data to be erased and the data to be erased coexist in the block, since in the NAND type SSD, processing of erasing data is accompanied with writing (writing back of the data not to be erased), there is a possibility of a reduction in the reading speed of data. In particular, in the NAND type SSD, since a wear leveling function for leveling the number of times of writing to one page operates, upon erasing data, data to be erased and data not to be erased are likely to coexist in one block.

As described above, in a case where erasing of print data from the printing SSD 112 is executed with reading of print data, there is a possibility of a reduction in the reading speed of the print data. As described above, in the printer 1, the printer unit 3 executes printing based on the print data read by the reading unit 103. Therefore, in a case where the reading speed of the reading unit 103 is reduced, the printer 1 may not execute printing based on the read print data so that there is a possibility that the printing operation is temporarily stopped due to the generation of a reduction in the printing speed. This causes the printer 1 to lengthen a time required for printing based on a plurality of print data.

In particular, since the printer 1 according to the embodiment executes printing on a large media M as compared with a normal printer, in a case where the printing operation is temporarily stopped, a movement is generated in the transport direction H with inertia, and in a case where the printing is started again, a printing position is shifted and a printing quality is likely to deteriorate.

Therefore, the printer control apparatus 10 according to the embodiment executes the following operations.

Figure 3:
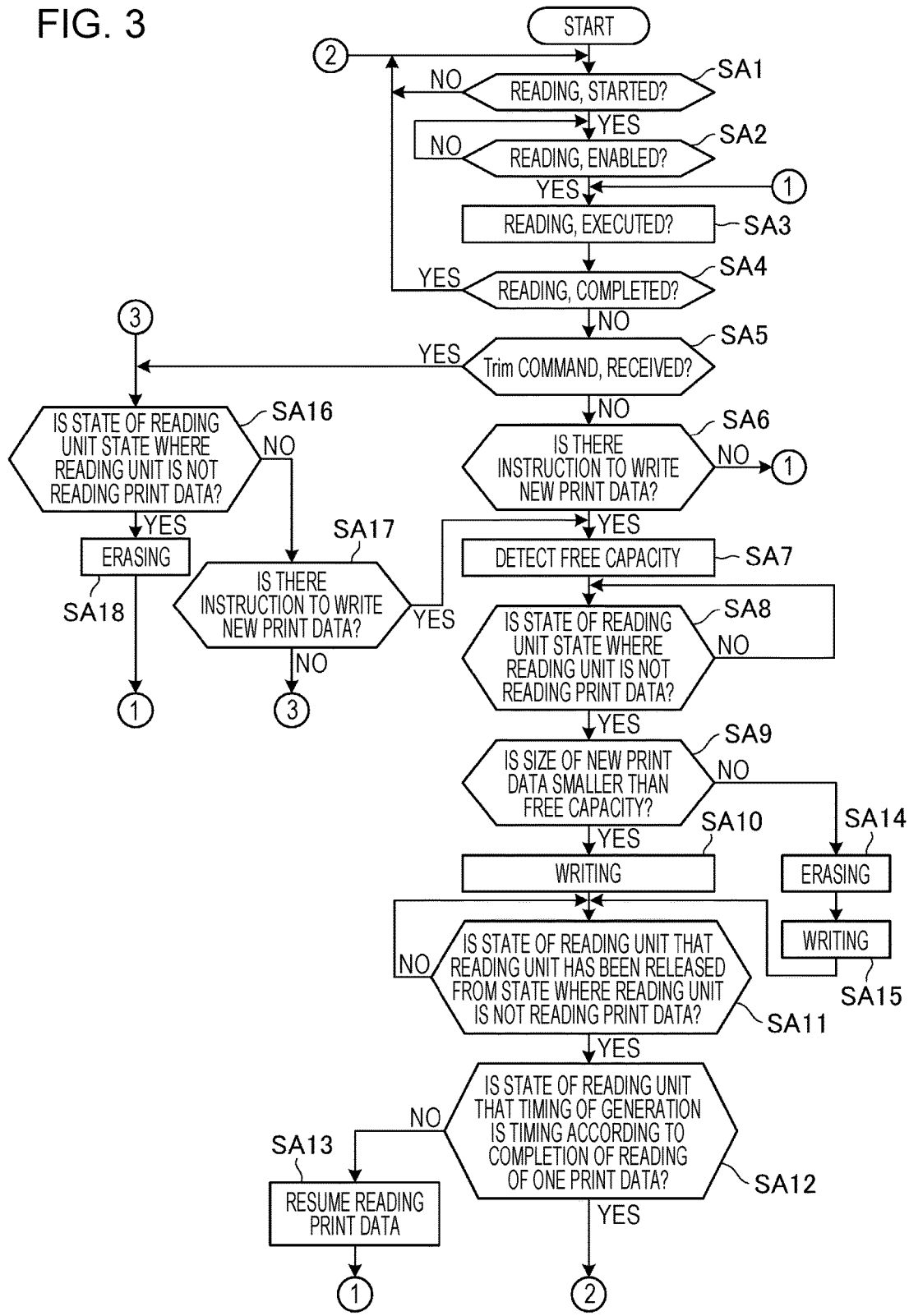
FIG. 3 is a flowchart showing operations of a printer control apparatus.

FIG. 3 is a flowchart showing operations of the printer control apparatus 10.

At the start time of the flowchart in FIG. 3, it is considered that a plurality of print data is written in the printing SSD 112. At the start time of the flowchart in FIG. 3, it is considered that at least one of the plurality of print data written in the printing SSD 112 is print data of which the printing has been completed by the printer 1 (hereinafter, expressed as "print data that have been printed").

The reading and writing control unit 104 of the printer control apparatus 10 determines whether or not to start reading the print data by the reading unit 103 (step SA1). For example, in a case where print data to be printed is specified by the user and the input unit 12 detects an operation to specify the print data, the reading and writing control unit 104 determines to start reading the specified print data from the printing SSD 112 based on an input from the input unit 12 (step SA1: YES). For example, in a case where print data to be printed is specified in advance and printing is reserved based on the print data, the reading and writing control unit 104 determines to start reading the specified print data from the printing SSD 112 (step SA1: NO).

Subsequently, in a case where it is determined to start reading the print data (step SA1: YES), the reading and writing control unit 104 determines whether or not a state of the printer 1 is a state where reading by the reading unit 103 is enabled (step SA2). For example, in a case where the printer 1 is provided with an ink remaining amount detection mechanism for detecting an ink remaining amount, and the ink remaining amount detected by the ink remaining amount detection mechanism is less than a predetermined remaining amount, the reading and writing control unit 104 determines that the ink is short, and determines that a state of the printer 1 is a state in which reading by the reading unit 103 is not enabled (step SA2: NO). For example, in a case where the printer 1 is provided with a medium remaining amount detection mechanism for detecting a remaining amount of the media M, and the remaining amount of the media M detected by the medium remaining amount detection mechanism is less than a predetermined remaining amount, the reading and writing control unit 104 determines that the media M needs to be replaced, and determines that a state of the printer 1 is a state in which reading by the reading unit 103 is not enabled (step SA2: NO).

In a case where it is determined that a state of the printer is a state where reading of the print data by the reading unit 103 is not enabled (step SA2: NO), the reading and writing control unit 104 executes processing of step SA2 again. On the other hand, in a case where the reading and writing control unit 104 determines that the state of the printer is a state in which reading of the print data by the reading unit 103 is enabled (step SA2: YES), the reading unit 103 reads the print data from the printing SSD 112 (step SA3). Accompanying the reading of the reading unit 103, the printer 1 executes printing based on the read print data.

Subsequently, the reading and writing control unit 104 determines whether or not to complete the reading of print data to be read by the reading unit 103 in step SA3 (step SA4). For example, in a case where the reading unit 103 has read all the print data to be read in step SA3, the reading and writing control unit 104 determines that reading of the print data to be read by the reading unit 103 in step SA3 is completed (step SA4: YES). In this determination, as soon as printing based on the print data written in the print buffer is completed, the printer 1 completes printing based on the print data to be read in step SA3. For example, in a case where the reading unit 103 has not read all the print data to be read in step SA3, the reading and writing control unit 104 determines that reading of the print data to be read by the reading unit 103 in step SA3 is completed (step SA4: YES). In this case, since reading from the reading unit 103 continues, the printer 1 continues printing based on the print data to be read in step SA3.

In a case where it is determined that the reading of the print data to be read by the reading unit 103 in step SA3 is completed (step SA4: YES), the reading and writing control unit 104 returns processing to step SA1. In a case where there is reserved printing based on the next print data in advance, the reading and writing control unit 104 executes the determination of "YES" in step SA1.

On the other hand, in a case where it is determined that the reading of the print data to be read by the reading unit 103 in step SA3 is not completed (step SA4: NO), the reading and writing control unit 104 determines whether or not a Trim command (erase command) is received (step SA5). In the embodiment, the Trim command is a command instructing to erase print data that have been printed from the printing SSD 112. For example, in a case where the Trim command is transmitted from the host computer 200, the reading and writing control unit 104 determines that the Trim command is received (step SA5: YES). For example, in a case where the user issues an instruction to erase the print data that have been printed and the input unit 12 detects an operation of the instruction and transmits the Trim command to the printer control apparatus 10, the reading and writing control unit 104 determines that the Trim command is received (step SA5: YES).

In a case where it is determined that the Trim command is not received (step SA5: NO), the reading and writing control unit 104 determines whether or not the writing unit 102 is instructed to start writing new print data (step SA6). In the embodiment, the new print data indicate print data that have been subjected to image processing by the image processing unit 101 and that have not been written to the printing SSD 112. For example, it is considered that a plurality of image data is received from the host computer 200, and a plurality of image data are stored in the receiving SSD 111. In this situation, in a case where the user specifies image data for generating print data, the reading and writing control unit 104 determines that the writing unit 102 is instructed to start writing new print data (step SA6: YES). For example, in a case where image data are received from the host computer 200, with a trigger of the reception, the reading and writing control unit 104 determines that the writing unit 102 is instructed to start writing new print data (step SA6: YES).

In a case where it is determined that the writing unit 102 is not instructed to start writing new print data (step SA6: NO), the reading and writing control unit 104 shifts processing to step SA3.

On the other hand, in a case where the reading and writing control unit 104 determines that there is an instruction to start writing new print data (step SA6: YES), the capacity detecting unit 105 detects a free capacity of the printing SSD 112 (step SA7).

Subsequently, the reading and writing control unit 104 determines whether or not the state of the reading unit 103 is a state where the reading unit is not reading print data from the printing SSD 112 (step SA8). As described above, as the print data are read from the reading unit 103, the printer 1 executes printing based on the read print data. Therefore, a state where the reading unit 103 is not reading the print data corresponds to a state where the printer 1 does not execute printing (hereinafter, expressed as an "unprinted state").

In the embodiment, as the state of the printer 1 is an unprinted state, it indicates at least one of a state related to a cleaning operation or a state related to the replacement of media M.

The state related to the cleaning operation indicates a state where a series of operations accompanying the cleaning operation is being executed. The cleaning operation is an operation of forcibly sucking ink accumulated in the nozzles of the ink jet head 51 and the ink jet head 52 to prevent ejection failure caused by thickening of ink generated as time passes. In a case where the printer 1 executes the cleaning operation, the printer 1 according to the embodiment moves the ink jet head 51 and the ink jet head 52 from a printing position where ink is ejected to the media M, to a cleaning position where the cleaning operation is executed. The cleaning position is, for example, provided at a position where ink does not land on the media M at the time of cleaning execution. In a case where the ink jet head 51 and the ink jet head 52 are moved to the cleaning position, the printer 1 executes the cleaning operation on the ink jet head 51 and the ink jet head 52. In a case where the cleaning operation is completed, the printer 1 moves the ink jet head 51 and the ink jet head 52 after the cleaning operation, from the cleaning position to the printing position. The state related to the cleaning operation also includes the state of an operation of moving the ink jet head 51 and the ink jet head 52.

The state related to the replacement of the media M indicates a state where a series of operations accompanying the replacement of the media M is being executed. Upon replacing the media M, the printer 1 enters a standby state so as not to start printing until the media M is replaced. The state related to the replacement of the media M also includes this standby state.

A period during which the state related to the cleaning operation and the state related to the replacement of the media M continues is assumed to be longer than a period required for erasing the print data from the printing SSD 112 in a supplementary embodiment.

Since the cleaning operation is an operation for preventing ejection failure of the nozzle, it is executed at predetermined intervals, for example, after one print data is printed, after the media M is transported by a predetermined amount, or after a period of printing execution has elapsed for a predetermined period of time. Therefore, the state related to the cleaning operation is an unprinted state generated at predetermined intervals. The replacement of the media M is executed at intervals at which the media M runs out. Therefore, the state related to the replacement of the media M is also an unprinted state generated at predetermined intervals.

In step SA8, in a case where it is determined that the state of the reading unit 103 is not a state where the reading unit is not reading print data from the printing SSD 112 (step SA8: NO), the reading and writing control unit 104 returns the processing to step SA8, and executes the determination in step SA8 again. On the other hand, in a case where it is determined that the state of the reading unit 103 is a state where the reading unit is not reading print data from the printing SSD 112 (step SA8: YES), the reading and writing control unit 104 determines whether or not a size of new print data (corresponding to an amount of data) is smaller than the free capacity detected in step SA7 (step SA9).

Subsequently, in a case where the reading and writing control unit 104 determines that the size of the new print data is smaller than the free capacity detected in step SA7 (step SA9: YES), the reading and writing control unit 104 causes the writing unit 102 to write new print data. As a result, the writing unit 102 writes new print data to the printing SSD 112 (step SA10).

Subsequently, the reading and writing control unit 104 determines whether or not the reading unit 103 has been released from the state where the reading unit is not reading the print data, that is, whether the state of the printer 1 has been released from the unprinted state (step SA11). That is, the reading and writing control unit 104 determines whether or not the state of the printer 1 has been released from the state related to the cleaning operation or the state related to the replacement of the media M in step SA11.

In a case where the reading and writing control unit 104 determines that the reading unit 103 has not been released from a state where the reading unit is not reading the print data (step SA11: NO), the reading and writing control unit 104 returns processing to step SA11 and executes the determination in step SA11 again. On the other hand, in a case where it is determined that the reading unit 103 has been released from the state where the reading unit is not reading the print data (step SA11: YES), the reading and writing control unit 104 determines whether or not a timing of the generation of a state where the reading unit 103 is not reading print data is a timing accompanying the completion of the reading of one print data (step SA12). As described above, a state where the reading unit 103 is not reading the print data (in particular, a state related to the cleaning operation) may be also generated after the completion of the reading one print data.

In a case where the reading and writing control unit 104 determines that the timing of the generation of a state where the reading unit 103 is not reading the print data is the timing accompanying the completion of the reading of one print data (step SA12: YES), the reading and writing control unit 104 executes the processing at step SA1. On the other hand, in a case where it is determined that the timing of the generation of the state where the reading unit 103 is not reading print data is not the timing according to the completion of one print data (step SA12: NO), the reading and writing control unit 104 determines to resume the reading of print data that were being read before the timing of the generation of a state where the reading unit 103 is not reading print data (step SA13), and returns processing to step SA3.

Returning to the description of step SA9, in a case where the reading and writing control unit 104 determines that the size of the new print data is not smaller than the free capacity detected in step SA7 (step SA9: NO), the reading and writing control unit 104 erases the print data that have been printed and that were written in the printing SSD 112 (step SA14).

In step SA14, the reading and writing control unit 104 erases print data with the oldest written timing among the print data that have been printed. In a case where, even if one print data that have been printed is erased, the printing SSD 112 may not secure a free capacity exceeding the size of the new print data, the reading and writing control unit 104 executes erasing of a plurality of print data that have been printed in the order of which a written timing is old.

In a case where there is erased the print data that have been printed and that were written in the printing SSD 112, the reading and writing control unit 104 causes the writing unit 102 to write new print data. As a result, the writing unit 102 writes new print data to the printing SSD 112 (step SA15). Subsequently, the reading and writing control unit 104 shifts processing to step SA11.

Here, there will be described the timings of the state of the printer control apparatus 10 in the case where the above-described operations are executed and printing based on a plurality of print data is executed.

Figure 4:
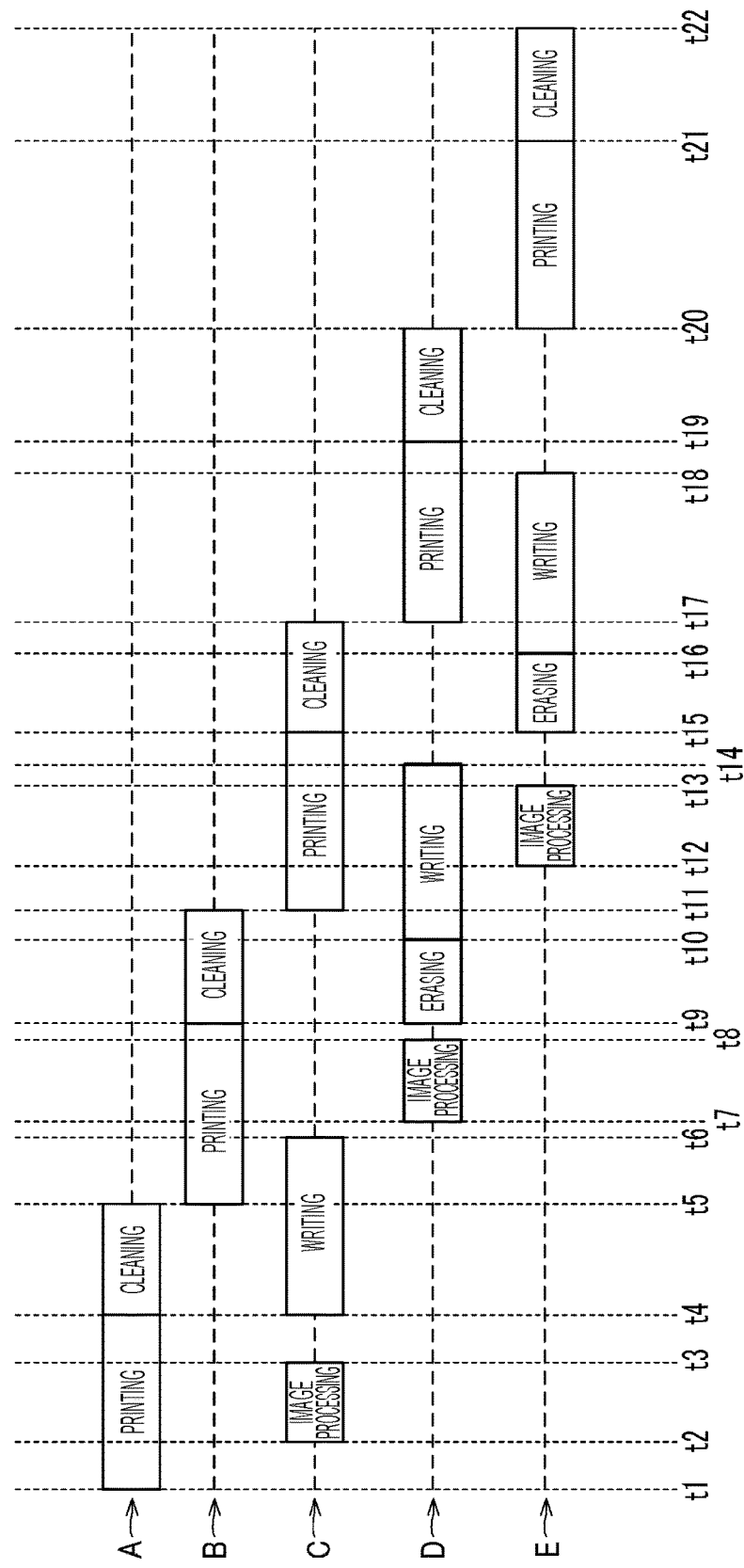
FIG. 4 is a timing chart showing states of the printer control apparatus.

FIG. 4 is a timing chart showing states of the printer control apparatus 10 in the case of executing printing based on a plurality of print data.

FIG. 4 illustrates a case where the printer control apparatus 10 executes an operation related to printing based on the five print data of print data A, print data B, print data C, print data D, and print data E.

In FIG. 4, a timing chart A shows the state of the printer control apparatus 10 in an operation related to printing based on the print data A, a timing chart B shows the state of the printer control apparatus 10 in an operation related to printing based on the print data B, a timing chart C shows the state of the printer control apparatus 10 in an operation related to printing based on the print data C, a timing chart D shows the state of the printer control apparatus 10 in an operation related to printing based on the print data D, and a timing chart E shows the state of the printer control apparatus 10 in an operation related to printing based on the print data E.

At the start time of the timing chart of FIG. 4, it is considered that the print data A and the print data B are written in the printing SSD 112, and the print data C, the print data D, and the print data E are not written in the printing SSD 112.

A "printing" shown in FIG. 4 indicates that reading of print data corresponding to the timing chart is executed, and printing based on the read print data is executed. A "cleaning" shown in FIG. 4 indicates that the state of the printer 1 is a state related to the cleaning operation. An "image processing" shown in FIG. 4 indicates that the image processing unit 101 generates print data from image data received from the host computer 200. A "writing" shown in FIG. 4 indicates that writing of print data corresponding to the timing chart is executed. An "erasing" shown in FIG. 4 indicates erasing of print data that have been printed, and does not show erasing of print data corresponding to the timing chart.

In FIG. 4, it is considered that the printer control apparatus 10 executes the cleaning operation after the completion of printing based on one print data.

As shown in the timing chart A of FIG. 4, the reading unit 103 of the printer control unit 100 starts reading the print data A at a timing t1. That is, the printer 1 starts printing based on the print data A at the timing t1.

It is considered that image data serving as a source of the print data C is transmitted from the host computer 200 at a timing t2 after a period from the timing t1 to the timing t2 has elapsed. Then, as shown in timing chart C of FIG. 4, the image processing unit 101 of the printer control unit 100 starts generating the print data C at the timing t2. Then, after a period from the timing t2 to a timing t3 has further elapsed, the image processing unit 101 completes generating the print data C.

It is considered that the reading of the print data A is completed, that is, the printing based on the print data A is completed at a timing t4 after a period from the timing t3 to the timing t4 has elapsed. Then, from the timing t4, the printer control unit 100 of the printer control apparatus 10 executes the cleaning operation. As a result, the state of the printer 1 is a state related to the cleaning operation from the timing t4. The state of the reading unit 103 is a state where the reading unit is not reading print data from the printing SSD 112.

As shown in the timing chart C of FIG. 4, at the timing t4, the writing unit 102 of the printer control unit 100 starts writing the print data C. In FIG. 4, it is considered that a free capacity of the printing SSD 112 in which the print data A and the print data B are written exceeds the size of the print data C. Therefore, in a case where the printer control apparatus 10 writes the print data C, the printer control apparatus 10 does not erase the print data A, although the print data A is the print data that have been printed. In this manner, since, in a case where the reading and writing control unit 104 writes the print data C, the reading and writing control unit 104 does not execute erasing of the print data that have been printed, it is possible to promptly write the print data C. Therefore, since the reading and writing control unit 104 may cause the writing unit 102 to promptly write the print data C, it is possible to shorten a period during which writing of the print data C and printing based on the print data B executed after the print data A (that is, reading of the print data B by the reading unit 103) overlap each other and it is possible to shorten a period during which the reading speed of the print data B is reduced. Therefore, the reading and writing control unit 104 may suppress prolongation of the time required for printing based on a plurality of print data.

As shown in the timing chart C of FIG. 4, although the generation of the print data C is completed at the timing t3, during reading of the print data A, the reading and writing control unit 104 does not cause the writing unit 102 to write the print data C. As a result, since the writing of the print data C and the reading of the print data A are not executed at the same time, the reading and writing control unit 104 may prevent the reading speed of the print data A from being reduced and suppress prolongation of the time required for printing based on the plurality of print data.

It is considered that the cleaning operation after printing based on the print data A is completed, as shown in the timing chart A of FIG. 4, at a timing t5 after a period from the timing t4 to the timing t5 has elapsed. That is, it is considered that the state of the printer 1 has been released from the state related to the cleaning operation at the timing t5. It is also considered that the state of the reading unit 103 has been released from the state in which the reading unit is not reading print data.

Then, as shown in the timing chart B of FIG. 4, the reading unit 103 of the printer control unit 100 starts reading the print data B at the timing t5. That is, the printer 1 starts printing based on the print data B at the timing t5.

It is considered that a period from the timing t5 to a timing t6 has elapsed. Then, as shown in the timing chart C of FIG. 4, the reading and writing control unit 104 completes the writing of the print data C.

It is considered that image data as a source of the print data D is transmitted from the host computer 200 at a timing t7 after a period from the timing t6 to the timing t7 has elapsed. Then, as shown in the timing chart D of FIG. 4, the image processing unit 101 of the printer control unit 100 starts generating the print data D at the timing t7. Then, after a period from the timing t7 to a timing t8 has further elapsed, the image processing unit 101 completes generating the print data D.

It is considered that the reading of the print data B is completed, that is, the printing based on the print data B is completed at a timing t9 after a period from the time t8 to the timing t9 has elapsed. Then, from the timing t9, the printer control unit 100 of the printer control apparatus 10 executes a cleaning operation. As a result, the state of the printer 1 is a state related to the cleaning operation from the timing t9. The state of the reading unit 103 is a state where the reading unit is not reading print data from the printing SSD 112.

As shown in the timing chart D of FIG. 4, at the timing t9, the reading and writing control unit 104 of the printer control unit 100 starts erasing the print data A among the print data that have been printed. In FIG. 4, it is considered that the free capacity of the printing SSD 112 in which the print data A, the print data B, and the print data C are written is smaller than the size of the print data D. Then, it is considered that a free capacity of the printing SSD 112 from which the print data A is erased exceeds the size of the print data D.

It is considered that erasing of print data A is completed at a timing t10 after a period from the timing t9 to a timing t10 has elapsed. Then, as shown in the timing chart D of FIG. 4, at the timing t10, the writing unit 102 of the printer control unit 100 starts writing the print data D. At the timing t10 at which writing of the print data D is started, the state of the printer 1 is a state related to a cleaning operation executed after the completion of printing based on the print data B. In this manner, in a case where the state of the printer 1 is a state related to the cleaning operation executed after the completion of printing based on the print data B, the reading and writing control unit 104 executes erasing of the print data A as the print data that have been printed, and after the erasing, executes writing of the print data D as new print data. In this manner, in a case where the state of the printer 1 is a state related to the cleaning operation (in a case where the reading unit 103 is in a state where the reading unit 103 is not reading print data), the reading and writing control unit 104 executes erasing of the print data A. Therefore, since, in a case where the print data A is erased, the reading and writing control unit 104 prevents the print data (for example, the print data B or the print data C) from being read, it is possible to suppress prolongation of a time required for a plurality of printing. In particular, since erasing of the print data A is executed by using the unprinted state generated at predetermined intervals in the printer 1, the reading and writing control unit 104 may prevent the reading speed of print data from being reduced to efficiently execute erasing of the print data A, thereby suppressing prolongation of the time required for the plurality of printing.

It is considered that the cleaning operation after printing based on the print data B is completed, as shown in the timing chart B of FIG. 4, at a timing t11 after a period from the timing t10 to the timing t11 has elapsed. That is, it is considered that the state of the printer 1 has been released from the state related to the cleaning operation at the timing t11.

Then, as shown in the timing chart C of FIG. 4, the reading unit 103 of the printer control unit 100 starts reading the print data C at the timing t11. That is, the printer 1 starts printing based on the print data C at the timing t11.

It is considered that a period from the timing t11 to a timing t12 has elapsed. Then, at the timing t12, it is considered that image data serving as a source of the print data D is transmitted from the host computer 200. Then, as shown in the timing chart E of FIG. 4, the image processing unit 101 of the printer control unit 100 starts generating the print data E at the timing t12. Then, after a period from the timing t12 to a timing t13 has further elapsed, the image processing unit 101 completes generating the print data E.

It is considered that a period from the timing t13 to a timing t14 has elapsed. Then, as shown in the timing chart D of FIG. 4, the reading and writing control unit 104 completes writing of the print data D.

It is considered that the reading of the print data C is completed, that is, the printing based on the print data C is completed, at a timing t15 after a period from the timing t14 to the timing t15 has elapsed. Then, from the timing t15, the printer control unit 100 of the printer control apparatus 10 executes a cleaning operation. As a result, the state of the printer 1 is a state related to the cleaning operation from the timing t15.

As shown in the timing chart E of FIG. 4, at the timing t15, the writing unit 102 of the printer control unit 100 starts erasing the print data B among the print data that have been printed. In FIG. 4, it is considered that the free capacity of the printing SSD 112 in which the print data B, the print data C, and the print data D are written is smaller than the size of the print data E. It is considered that a free capacity of the printing SSD 112 from which the print data B is erased exceeds the size of the print data E.

It is considered that erasing of the print data B is completed at a timing t16 after a period from the timing t15 to the timing t16 has elapsed. Then, as shown in the timing chart E of FIG. 4, at the timing t16, the writing unit 102 of the printer control unit 100 starts writing the print data E. At the timing t16 at which writing of the print data E is started, the state of the printer 1 is a state related to a cleaning operation executed after the completion of printing based on the print data C. In this manner, in a case where the state of the printer 1 is a state related to the cleaning operation executed after the completion of printing based on the print data C, the reading and writing control unit 104 executes erasing of the print data B as the print data that have been printed, and after the erasing, executes writing of the print data E as new print data. In this manner, in a case where the state of the printer 1 is a state related to a cleaning operation in which reading of print data are not executed, the reading and writing control unit 104 executes erasing of the print data B. Therefore, since, in a case where the print data B is erased, the reading and writing control unit 104 prevents the print data (for example, the print data C or the print data D) from being read, it is possible to suppress prolongation of the time required for a plurality of printing. In particular, since erasing of the print data B is executed by using the unprinted state generated at predetermined intervals in the printer 1, the reading and writing control unit 104 may prevent the reading speed of the print data from being reduced to efficiently execute erasing of the print data B, thereby suppressing prolongation of the time required for the plurality of printing.

It is considered that the cleaning operation after printing based on the print data C is completed, as shown in the timing chart C of FIG. 4, at a timing t17 after a period from the timing t16 to the timing t17 has elapsed. That is, it is considered that the state of the printer 1 has been released from the state related to the cleaning operation at the timing t17.

Then, as shown in the timing chart D of FIG. 4, the reading unit 103 of the printer control unit 100 starts reading the print data D at the timing t17. That is, the printer 1 starts printing based on the print data D at the timing t17.

It is considered that a period from the timing t17 to a timing t18 has elapsed. Then, as shown in the timing chart E of FIG. 4, the reading and writing control unit 104 completes the writing of the print data E.

It is considered that reading of the print data D is completed, that is, the printing based on the print data D is completed, at a timing t19 after a period from the timing t18 to the timing t19 has elapsed. Then, from the timing t19, the printer control apparatus 10 executes the cleaning operation. As a result, the state of the printer 1 is a state related to the cleaning operation from the timing t19.

It is considered that the cleaning operation after printing based on the print data D is completed, as shown in the timing chart D of FIG. 4, at a timing t20 after a period from the timing t19 to the timing t20 has elapsed. That is, it is considered that the state of the printer 1 has been released from the state related to the cleaning operation at the timing t20.

Then, as shown in the timing chart E of FIG. 4, the reading unit 103 of the printer control unit 100 starts reading the print data E at the timing t20. That is, the printer 1 starts printing based on the print data E at the timing t20.

It is considered that reading of the print data E is completed that is, the printing based on the print data E is completed, at a timing t21 after a period from the timing t20 to the timing t21 has elapsed. Then, from the timing t21, the printer control apparatus 10 executes the cleaning operation. As a result, the state of the printer 1 is a state related to the cleaning operation from the timing t21. Then, the cleaning operation after printing based on the print data D is completed, as shown in the timing chart E of FIG. 4, at a timing t22 after a period from the timing t21 to the timing t22 has elapsed. That is, the state of the printer 1 has been released from the state related to the cleaning operation at the timing t22.

As described above, printing based on the five print data of the print data A to E is completed.

In this manner, the reading and writing control unit 104 controls erasing of the print data that have been printed according to the read state of the print data of the reading unit 103, and causes the writing unit 102 to write new print data. As a result, the reading and writing control unit 104 may control erasing of the print data that have been printed efficiently from the printing SSD 112, thereby suppressing prolongation of the time required for a plurality of printing. More specifically, in a case where the reading unit 103 is in a state where the reading unit is not reading the print data (in FIG. 4, in a case where the state of the printer 1 is a state related to the cleaning operation), the reading and writing control unit 104 erases the print data that have been printed from the printing SSD 112, and thereafter causes the writing unit 102 to write new print data into the printing SSD 112. As a result, since, in a case where the print data that have been printed is erased, the reading and writing control unit 104 does not cause the reading unit 103 to read the print data, it is possible to suppress prolongation of the time required for a plurality of printing. In particular, since erasing of the print data that have been printed is executed by using the unprinted state generated at predetermined intervals in the printer 1, the reading and writing control unit 104 may prevent the reading speed of the print data of the reading unit 103 from being reduced to efficiently execute erasing of the print data that have been printed, thereby suppressing prolongation of the time required for a plurality of printing. Furthermore, since the reading and writing control unit 104 may prevent a reading speed of the print data of the reading unit 103 from being reduced, it is possible to suppress a temporary stop of a printing operation caused by the reduction in the reading speed, and in a case where the printing is started again, a printing position may be prevented from being shifted, thereby suppressing deterioration of printing quality even in the printer 1, in which the printing quality is likely to deteriorate as compared with a normal printer.

In a case where the size of the new print data is smaller than the free capacity of the printing SSD 112, the reading and writing control unit 104 causes the writing unit 102 to write the new print data without erasing the print data that have been printed from the printing SSD 112. As a result, in a case where the size of the new print data is a size in which it is necessary to erase the print data that have been printed, the reading and writing control unit 104 executes erasing of the print data that have been printed from the printing SSD 112. In a case where the size of the new print data is a size in which it is unnecessary to erase the print data that have been printed, the reading and writing control unit 104 does not erase the print data that have been printed from the printing SSD 112. As a result, the reading and writing control unit 104 may efficiently execute writing of the new print data into the printing SSD 112 according to the size of the new print data, thereby suppressing prolongation of the time required for a plurality of printing. Furthermore, since, in a case where the size of the new print data is a size in which it is unnecessary to erase the print data that have been printed, the new print data may be promptly written, the reading and writing control unit 104 may shorten a period during which writing of the new print data and reading of print data already written overlap each other, thereby suppressing prolongation of the time required for a plurality of printing.

In a case where the reading unit 103 is in a state where the reading unit 103 is reading the print data, the reading and writing control unit 104 does not start erasing the print data that have been printed. For example, in the case of FIG. 4, the reading and writing control unit 104 does not start erasing the print data A during reading of the print data B. As a result, the reading and writing control unit 104 may prevent erasing of the print data that have been printed and reading of the print data of the reading unit 103 from being executed at the same time so that it is possible to prevent the reading speed of the print data from being reduced, thereby suppressing prolongation of the time required for a plurality of printing.

In FIG. 4, there is illustrated a case where the state of the printer 1 is a state related to the cleaning operation, as a state where the reading unit 103 is not reading the print data, but a state related to the replacement of the media M may be used. FIG. 4 illustrates the case where the state of the printer 1 shifts to the state related to the cleaning operation after completion of printing based on the one print data, but during the printing based on the one print data, the state of the printer 1 may shift to the state related to the cleaning operation. Even in this case, in a case where the reading unit 103 is in a state where the reading unit 103 is not reading the print data, erasing of print data that have been printed and writing of new print data start to be executed so that the same effects as those described above is obtained.

Returning to the description of step SA5 in the flowchart of FIG. 3, in a case where it is determined that the Trim command has been received (step SA5: YES), the reading and writing control unit 104 determines whether or not the state of the reading unit 103 is a state where the reading unit is not reading print data from the printing SSD 112 (step SA16).

In a case where it is determined that the state of the reading unit 103 is not a state where the reading unit is not reading print data from the printing SSD 112 (step SA16: NO), the reading and writing control unit 104 determines whether or not the writing unit 102 is instructed to start writing new print data (step SA17).

In a case where it is determined that the writing unit 102 is instructed to start writing new print data (step SA17: YES), the reading and writing control unit 104 shifts processing to step SA7. On the other hand, in a case where it is determined that the writing unit 102 is not instructed to start writing new print data (step SA17: NO), the reading and writing control unit 104 erases print data that have been printed from the printing SSD 112 based on the Trim command (step SA18). For example, in step SA18, in a case where the Trim command includes information specifying print data to be erased, the reading and writing control unit 104 erases the specified print data from the printing SSD 112. Also, for example, in a case where the information specifying the print data to be erased is not included in the Trim command in step SA18, the reading and writing control unit 104 erases the print data that have been printed among the print data written in the printing SSD 112 and have the oldest written timing.

Here, there will be described the timing of states of the printer control apparatus 10 in the case where the Trim command has been received to execute operations and printing based on a plurality of print data is executed.

Figure 5:
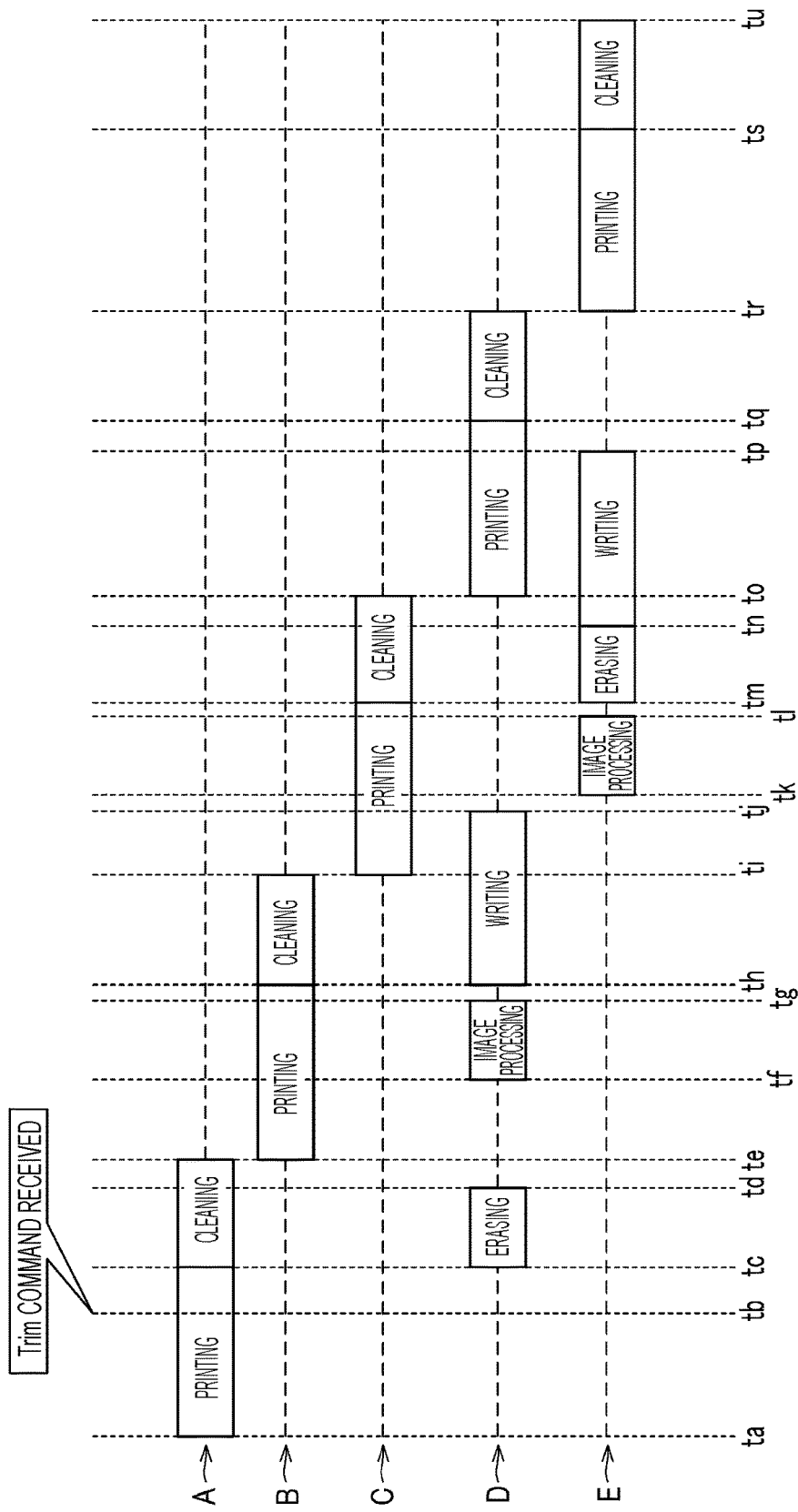
FIG. 5 is a timing chart showing states of the printer control apparatus.

FIG. 5 is a timing chart showing states of the printer control apparatus 10 in the case where the Trim command has been received to execute operations and the printing based on a plurality of print data is executed.

In FIG. 5, similarly to FIG. 4, there is illustrated a case where the printer control apparatus 10 executes an operation related to the printing based on the five print data of the print data A, the print data B, the print data C, the print data D, and the print data E.

In FIG. 5, the timing chart A shows the state of the printer control apparatus 10 in an operation related to printing based on the print data A, the timing chart B shows the state of the printer control apparatus 10 in an operation related to printing based on the print data B, the timing chart C shows the state of the printer control apparatus 10 in an operation related to printing based on the print data C, the timing chart D shows the state of the printer control apparatus 10 in an operation related to printing based on the print data D, and the timing chart E shows the state of the printer control apparatus 10 in an operation related to printing based on the print data E.

At the start time of the timing chart of FIG. 5, unlike FIG. 4, it is considered that the print data A, the print data B, and the print data C are written in the printing SSD 112, and the print data D and the print data E are not written in the printing SSD 112. In the description of FIG. 5, it is considered that the printing SSD 112 may write print data up to three and it is necessary to erase the print data in a case where print data is written thereafter.

A "printing", "cleaning", "image processing", "writing", and "erasing" shown in FIG. 5 indicate the same contents as those shown in FIG. 4.

In FIG. 5, similarly to FIG. 4, it is considered that the cleaning operation is executed by the printer control apparatus 10 after the completion of printing based on the one print data.

As shown in the timing chart A of FIG. 5, the reading unit 103 of the printer control unit 100 starts reading the print data A at a timing ta. That is, the printer 1 starts printing based on the print data A at the timing ta.

It is considered that a Trim command is received from the host computer 200 at a timing tb after a period from the timing ta to the timing tb has elapsed.

It is considered that the reading of the print data A is completed, that the printing based on the print data A is completed, at a timing tc after a period from the timing tb to the timing tc has elapsed. Then, from the timing tc, the printer control unit 100 of the printer control apparatus 10 executes the cleaning operation. As a result, the state of the printer 1 is a state related to the cleaning operation from the timing tc.

As shown in the timing chart D of FIG. 5, at the timing tc, the reading and writing control unit 104 of the printer control unit 100 starts erasing the print data that have been printed according to the Trim command received at the timing tb. At the timing tc, only the print data A among the print data written in the printing SSD 112 are the print data that have been printed, so that the reading and writing control unit 104 starts erasing the print data A from the timing tc.

It is considered that a period from the timing tc to a time td has elapsed. Then, the reading and writing control unit 104 completes erasing the print data A at the timing td.

It is considered that the cleaning operation after printing based on the print data A is completed as shown in the timing chart A of FIG. 5, at a timing te after a period from the timing td to the timing te has elapsed. That is, it is considered that the state of the printer 1 has been released from the state related to the cleaning operation at the timing te.

Then, as shown in the timing chart B of FIG. 5, the reading unit 103 of the printer control unit 100 starts reading the print data B at the timing te. That is, the printer 1 starts printing based on the print data B at the timing te.

It is considered that image data as a source of the print data D is transmitted from the host computer 200, at a timing tf after a period from the timing te to the timing tf has elapsed. Then, as shown in the timing chart D of FIG. 5, the image processing unit 101 of the printer control unit 100 starts generating the print data D at the timing tf. Then, after a period from the timing tf to the timing tg has further elapsed, the image processing unit 101 completes generating the print data D.

It is considered that the reading of the print data B is completed, that is, the printing based on the print data B is completed, at a timing th after a period from the timing tg to the timing th has elapsed. Then, from the timing th, the printer control unit 100 of the printer control apparatus 10 executes the cleaning operation. As a result, the state of the printer 1 is a state related to the cleaning operation from the timing th.

As shown in the timing chart D of FIG. 5, at the timing th, the writing unit 102 of the printer control unit 100 starts writing the print data D. As described above, in the description of FIG. 5, the number of print data that may be written in the printing SSD 112 is three. Due to the reception of the Trim command, at the timing th, the number of the print data written to the printing SSD 112 are two by the print data B and the print data C. Therefore, at the timing th, since there is provided the free capacity for writing the print data D in the printing SSD 112 in advance, the reading and writing control unit 104 causes the writing unit 102 to writes the print data D without accompanying erasing of the print data that have been printed.

In this manner, since the print data that have been printed is erased in advance, the reading and writing control unit 104 does not erase the print data that have been printed in a case where the print data D is written, so that it is possible to promptly write the print data D. Therefore, since the reading and writing control unit 104 may cause the writing unit 102 to promptly write the print data D, it is possible to shorten a period during which writing of the print data D and printing based on the print data C executed after the print data B (that is, reading of the print data of the print data C by the reading unit 103) overlap each other, and it is possible to shorten a period during which the reading speed of the print data C is reduced. Therefore, the reading and writing control unit 104 may suppress prolongation of the time required for printing based on a plurality of print data.

It is considered that the cleaning operation after printing based on the print data B is completed, as shown in the timing chart B of FIG. 5, at a timing ti after a period from the timing th to the timing ti has elapsed. That is, it is considered that the state of the printer 1 has been released from the state related to the cleaning operation at the timing ti.

Then, as shown in timing chart C of FIG. 5, the reading unit 103 of the printer control unit 100 starts reading the print data C at the timing ti. That is, the printer 1 starts printing based on the print data C at the timing ti.

It is considered that a period from the timing ti to a timing tj has elapsed. Then, as shown in the timing chart D of FIG. 5, the writing unit 102 completes the writing of the print data D.

It is considered that image data as a source of the print data E is transmitted from the host computer 200, at a timing tk after a period from the timing tj to the timing tk has elapsed. Then, as shown in the timing chart E of FIG. 5, the image processing unit 101 of the printer control unit 100 starts generating the print data E at the timing tk. Then, after a period from the timing tk to a timing t1 has further elapsed, the image processing unit 101 completes generating the print data E.

It is considered that the reading of the print data C is completed, that is, the printing based on the print data C is completed, at a timing tm after a period from the timing t1 to the timing tm has elapsed. Then, from the timing tm, the printer control apparatus 10 executes a cleaning operation. As a result, the state of the printer 1 is a state related to the cleaning operation from the timing tm.

As shown in the timing chart E of FIG. 5, at the timing tm, the reading and writing control unit 104 of the printer control unit 100 starts erasing the print data B among the print data that have been printed. In FIG. 5, it is assumed that print data are written up to three in the printing SSD 112. At the timing tm, print data B, print data C, and print data D are written in the printing SSD 112. Therefore, before writing the print data E, the reading and writing control unit 104 executes erasing of the print data B as the print data that have been printed at the timing tm.

It is considered that the erasing of the print data B is completed, at a timing tn after a period from the timing tm to the timing tn has elapsed. Then, as shown in the timing chart E of FIG. 5, at the timing tn, the writing unit 102 of the printer control unit 100 starts writing the print data E. At the timing tn at which writing of the print data E is started, the state of the printer 1 is a state related to a cleaning operation executed after the completion of printing based on the print data C. In this manner, in a case where the state of the printer 1 is a state related to the cleaning operation executed after the completion of the printing based on the print data C, the reading and writing control unit 104 executes erasing of the print data B as the print data that have been printed, and after the erasing, executes writing of the print data E as new print data. That is, in a case where the state of the printer 1 is a state related to the cleaning operation in which reading of print data is not executed, the reading and writing control unit 104 executes erasing of the print data B. Therefore, since, in a case where the print data B is erased, the reading and writing control unit 104 prevents the print data (for example, the print data C or the print data D) from being read, it is possible to suppress prolongation of the time required for a plurality of printing.

It is considered that the cleaning operation after printing based on the print data C is completed, as shown in the timing chart C of FIG. 5, at a timing to after a period from the timing tn to the timing to has elapsed. That is, it is considered that the state of the printer 1 has been released from the state related to the cleaning operation at the timing to.

Then, as shown in the timing chart D of FIG. 5, the reading unit 103 of the printer control unit 100 starts reading the print data D at the timing to. That is, the printer 1 starts printing based on the print data D at the timing to.

It is considered that a period from the timing to a time tp has elapsed. Then, as shown in the timing chart E of FIG. 4, the reading and writing control unit 104 completes the writing of the print data E.

It is considered that the reading of the print data D is completed, that is, the printing based on the print data D is completed, at a timing tq after a period from the timing tp to the timing tq has elapsed. Then, from the timing tq, the printer control unit 100 of the printer control apparatus 10 executes the cleaning operation. As a result, the state of the printer 1 is a state related to the cleaning operation from the timing tq.

It is considered that the cleaning operation after printing based on the print data D is completed, as shown in the timing chart D of FIG. 5, at a timing tr after a period from the timing tq to the timing tr has elapsed. That is, it is considered that the state of the printer 1 has been released from the state related to the cleaning operation at the timing tr.

Then, as shown in the timing chart E of FIG. 5, the reading unit 103 of the printer control unit 100 starts reading the print data E at the timing tr. That is, the printer 1 starts printing based on the print data E at the timing tr.

It is considered that the reading of the print data E is completed, that is, the printing based on the print data E is completed, at a timing ts after a period from the timing tr to the timing ts has elapsed. Then, from the timing ts, the printer control unit 100 of the printer control apparatus 10 executes a cleaning operation. As a result, the state of the printer 1 is a state related to the cleaning operation from the timing ts. Then, the cleaning operation after printing based on the print data E is completed, as shown in a timing chart E of FIG. 5, at a timing tu after a period from the timing is to the timing tu has elapsed. That is, the state of the printer 1 has been released from the state related to the cleaning operation at the timing tu.

As described above, printing based on the five print data of the print data A to E is completed.

As described above, until there is an instruction to start writing new print data, the reading and writing control unit 104 erases the print data that have been printed from the printing SSD 112 in a case where the Trim command is received. In a case where the writing of new print data is started and the size of the new print data is smaller than the free capacity of the printing SSD 112, the reading and writing control unit 104 causes the writing unit 102 to write new print data without executing erasing of the print data that have been printed. As a result, since, in advance, the reading and writing control unit 104 provides a free capacity equal to the size of the new print data in the printing SSD 112, the writing of the new print data is promptly enabled, thereby suppressing prolongation of the time required for a plurality of printing.

As described above, in the NAND type SSD, since the wear leveling function for leveling the number of times of writing to one page operates, upon erasing data, data to be erased and data not to be erased are likely to coexist in one block. That is, fragmentation is likely to be generated in the printing SSD 112. Therefore, in consideration of fragmentation of the printing SSD 112, the printer control apparatus 10 may execute the following operations.

Figure 6A:
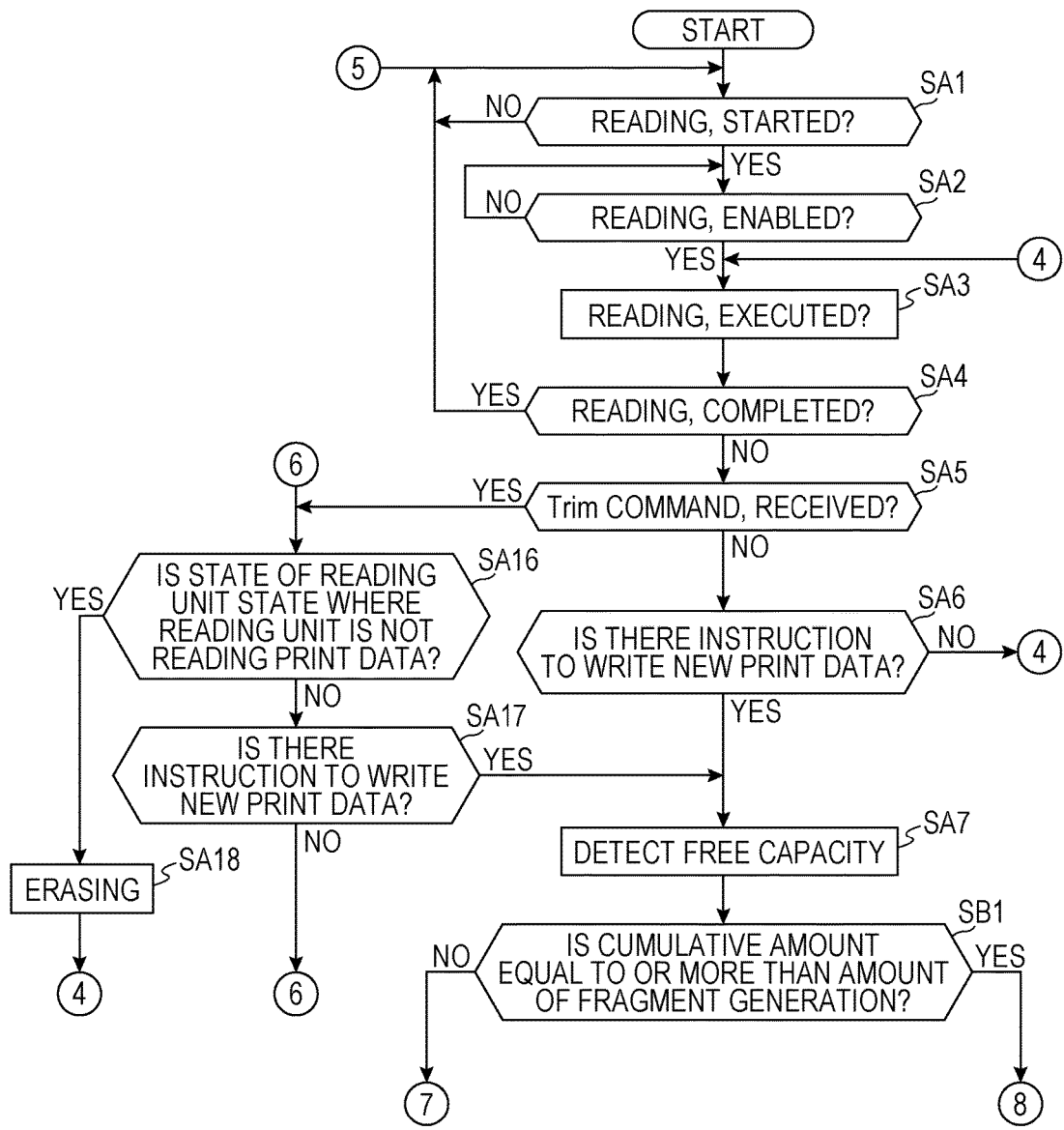
Figure 6B:
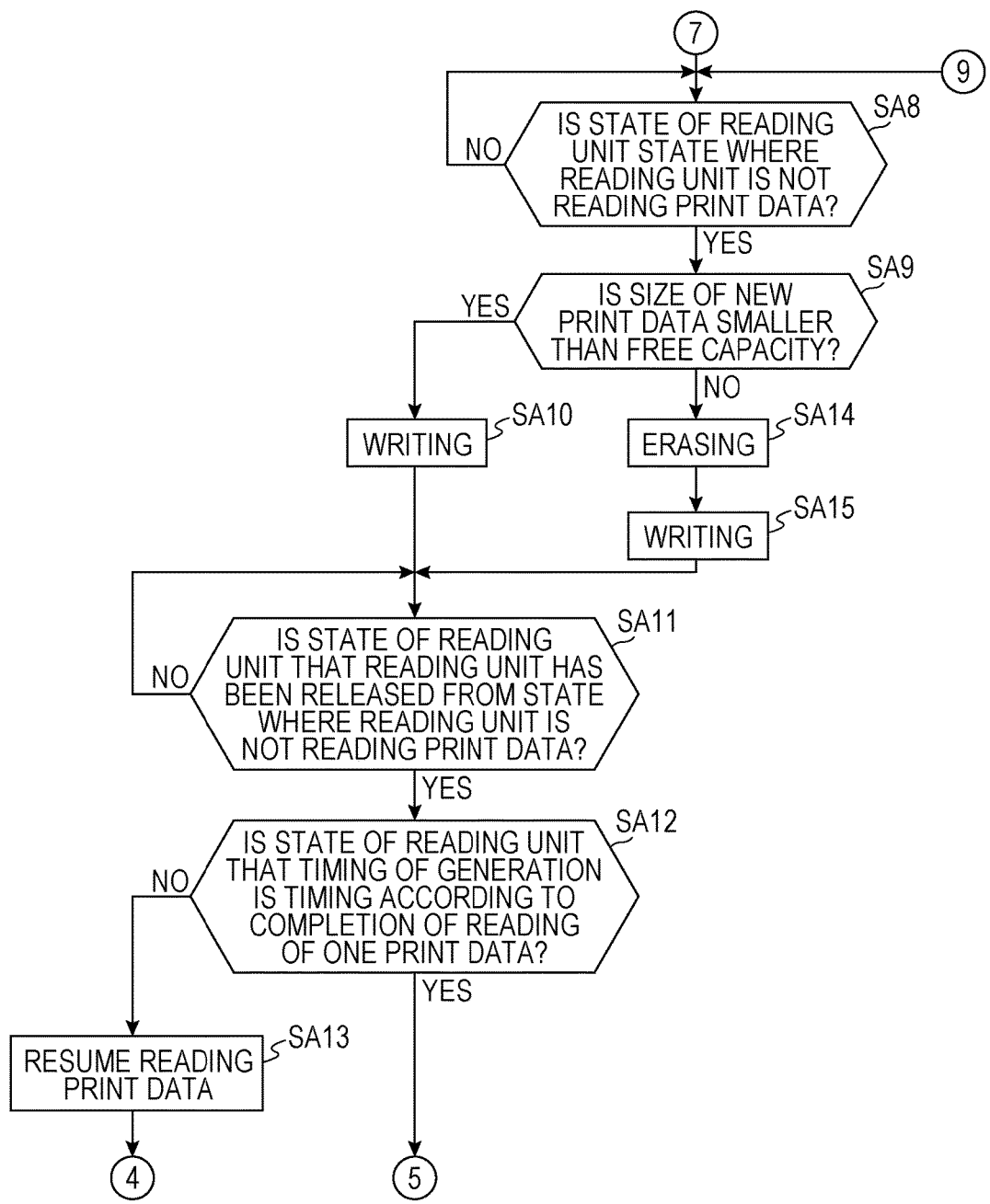

FIGS. 6A to 6C are flowcharts showing operations of the printer control apparatus 10.

In the flowcharts of FIGS. 6A to 6C, the same steps as those in the flowchart of FIG. 3 are denoted by the same step numbers, and the detailed description of the processing is omitted.

In a case where the capacity detecting unit 105 detects the free capacity of the printing SSD 112 in step SA7, the reading and writing control unit 104 determines whether or not a cumulative amount measured by the measuring unit 106 is equal to or more than an amount of fragment generation (a predetermined amount) (step SB1). Here, the amount of fragment generation indicates a cumulative amount that the printing SSD 112 becomes in a fragmented state. The amount of fragment generation is predetermined by a test or simulation or the like executed in advance, and is stored as information in the printer storage unit 110 or the like.

In a case where it is determined that the cumulative amount measured by the measuring unit 106 is less than the amount of fragment generation (step SB1: NO), the reading and writing control unit 104 shifts processing to step SA8 and executes the above-described processing.

On the other hand, in a case where the reading and writing control unit 104 determines that the cumulative amount measured by the measuring unit 106 is equal to or more than the amount of fragment generation (step SB1: YES), the reporting unit 107 reports information on a reduction in the printing speed and information on fragmentation to the user by displaying them on the display unit 13 (step SB2). For example, the reporting unit 107 reports information on the reduction in the printing speed such as "there is a possibility of a reduction in the printing speed", and information on the generation of fragmentation such as "there is a possibility of fragmentation" by displaying them on the display unit 13. As a result, the user may recognize that there is possibility of a reduction in the printing speed of the printer 1. Since information on fragmentation is reported, the user may recognize that the possibility of a reduction in the printing speed is caused by fragmentation that may be generated in the printing SSD 112.

Subsequently, in a case where the reporting unit 107 reports the user of the information on the reduction in the printing speed and the information on the fragmentation by displaying them on the display unit 13, the eliminating unit 108 determines whether or not to eliminate fragmentation that may be generated in a printing SSD 112 (step SB3) For example, the eliminating unit 108 displays a predetermined user interface, and in a case where there is an instruction to eliminate the fragmentation by an operation of the user on the user interface, it is determined to eliminate fragmentation that may be generated in the printing SSD 112 (step SB3: YES). For example, the eliminating unit 108 displays a predetermined user interface, and in the case where there is an instruction not to eliminate the fragmentation by an operation of the user on the user interface, it is determined not to eliminate fragmentation that may be generated in the printing SSD 112 (step SB3: NO).

In a case where it is determined that eliminating unit 108 does not eliminates the fragmentation that may be generated in the printing SSD 112 (step SB3: NO), the reading and writing control unit 104 shifts processing to step SA8 and executes the above-described processing.

On the other hand, in a case where it is determined that the eliminating unit 108 eliminates fragmentation that may be generated in the printing SSD 112 (step SB3: YES), the reading and writing control unit 104 determines whether or not the state of the reading unit 103 is a state where the reading unit is not reading print data from the printing SSD 112 (step SB4).

In a case where it is determined in step SB4 that the state of the reading unit 103 is not a state where the reading unit is not reading print data from the printing SSD 112 (step SB4: NO), the reading and writing control unit 104 returns processing to step SB4 and executes the determination in step SB4. On the other hand, in a case where it is determined that the state of the reading and writing control unit 104 is a state where the reading unit is not reading print data from the printing SSD 112 (step SB4: YES), the reading and writing control unit 104 determines whether or not a size of new print data is smaller than the free capacity detected in step SA7 (step SB5).

Subsequently, in a case where the reading and writing control unit 104 determines that the size of the new print data is smaller than the free capacity detected in step SA7 (step SB5: YES), the eliminating unit 108 eliminates fragmentation that may be generated in the printing SSD 112 (step SB6). Subsequently, in a case where the eliminating unit 108 eliminates fragmentation that may be generated in the printing SSD 112, the reading and writing control unit 104 causes the writing unit 102 to write new print data. As a result, the writing unit 102 writes new print data to the printing SSD 112 (step SB7).

Subsequently, the reading and writing control unit 104 determines whether or not the reading unit 103 has been released from the state where the reading unit is not reading print data, that is, whether or not the state of the printer 1 has been released from the unprinted state (step SB8). That is, the reading and writing control unit 104 determines whether or not the state of the printer 1 has been released from the state related to the cleaning operation or the state related to the replacement of the media M in step SB8.

In a case where it is determined that the reading unit 103 has not been released from the state where the reading unit is not reading print data (step SB8: NO), the reading and writing control unit 104 returns processing to step SB8 and executes the determination in step SB8 again. On the other hand, in a case where it is determined that the reading unit 103 has been released from the state in which the reading unit is not reading print data (step SB8: YES), the reading and writing control unit 104 determines whether or not a timing on the generation of a state where the reading unit 103 is not reading the print data is a timing accompanying the completion of reading one print data (step SB9). As described above, a state where the reading unit 103 is not reading the print data (in particular, a state related to the cleaning operation) may be also generated after the completion of the reading one print data.

In a case where it is determined that the timing on the generation of the state where the reading unit 103 is not reading the print data is the timing accompanying the completion of reading one print data (step SB9: YES), the reading and writing control unit 104 returns processing to step SA1. On the other hand, in a case where it is determined that the timing on the generation of the state where the reading unit 103 is not reading the print data is not the timing accompanying the completion of reading one print data (step SB9: NO), the reading and writing control unit 104 determines to resume reading print data that have been read before the timing on the generation of the state where the reading unit 103 is not reading the print data (step SB10), and returns processing to step SA3.

Returning to the description of step SB5, in a case where the reading and writing control unit 104 determines that the size of the new print data is smaller than the free capacity detected in step SA7 (step SB5: NO), an eliminating unit 108 eliminates fragmentation that may be generated in the printing SSD 112 (step SB11). Subsequently, in a case where the eliminating unit 108 eliminates fragmentation that may be generated in the printing SSD 112, the reading and writing control unit 104 erases the print data that have been printed and that were written in the printing SSD 112 (step SB12).

In a case where there is erased the print data that have been printed and that were written in the printing SSD 112, the reading and writing control unit 104 causes the writing unit 102 to write new print data. As a result, the writing unit 102 writes new print data to the printing SSD 112 (step SB13). Subsequently, the reading and writing control unit 104 shifts processing to step SA11.

In this manner, in a case where the cumulative amount measured by the measuring unit 106 is equal to or more than an amount of fragmentation generation, the reporting unit 107 reports the information on the reduction in the printing speed and the information on fragmentation. In a case where the user issues an instruction to eliminate the fragmentation, the eliminating unit 108 eliminates fragmentation that may be generated in the printing SSD 112. As well known, in a case where the nonvolatile memory such as the SSD is in a fragmented state, the reading speed of data and the writing speed of data is reduced. Therefore, the eliminating unit 108 may eliminate a reduction in the reading speed of the print data caused by fragmentation that may be generated in the printing SSD 112. In particular, in the case where the reading unit 103 is in a state where the reading unit 103 is not reading the print data, the eliminating unit 108 eliminates fragmentation that is generated in the printing SSD 112, so that the processing of eliminating fragmentation and the reading of the print data do not overlap each other. Therefore, the eliminating unit 108 prevents a plurality of processes from being executed in parallel to the printing SSD 112, prevents a reduction in the reading speed of the print data of the reading unit 103, thereby suppressing prolongation of the time required for a plurality of printing. In addition, since the eliminating unit 108 eliminates fragmentation that may be generated in the printing SSD 112 before writing new print data, it is possible to prevent a reduction in writing speed caused by fragmentation.

In the above-described operation, the configuration in which the reading and writing control unit 104 erases the print data that have been printed after the eliminating unit 108 resolves the fragmentation of the printing SSD 112 has been illustrated, but the processing of step SB11 and step SB12 May be reversed in order.

As described above, the printer control apparatus 10 (printing control apparatus) controls the printer 1 (printing apparatus) executing printing based on the print data. The printer control apparatus 10 includes a printer storage unit 110 (storage unit) having a printing SSD 112 (nonvolatile memory) in which reading and writing are executed in units of pages; a writing unit 102 that writes print data to the printing SSD 112; a reading unit 103 that reads print data from the printing SSD 112; and a reading and writing control unit 104 (control unit) that controls erasing of the print data that have been printed from the printing SSD 112 according to a read state of the reading unit 103 and causes the writing unit 102 to writes the new print data.

In this configuration, since the reading and writing control unit 104 controls erasing of the print data that have been printed according to the read state of the reading unit 103 and causes the writing unit 102 to write the new print data, it is possible to efficiently control erasing of the print data that have been printed from the printing SSD 112, thereby suppressing prolongation of the time required for printing.

In a case where the reading unit 103 is in a state where the reading unit 103 is not reading the print data, the reading and writing control unit 104 erases the print data that have been printed from the printing SSD 112 and causes the writing unit 102 to write new print data.

In this configuration, since, in a case where the reading unit 103 is in a state in which the reading unit 103 is not reading the print data, the reading and writing control unit 104 erases the print data that have been printed and writes new print data, erasing of print data that have been printed and reading of print data do not overlap each other, it is possible to prevent a reduction in the reading speed of the print data caused by erasing of the print data that have been printed, thereby suppressing prolongation of the time required for a plurality of printing.

In a case where the reading unit 103 is in a state where the reading unit is reading the print data, the reading and writing control unit 104 does not start erasing the print data that have been printed from the printing SSD 112.

In this configuration, since erasing of the print data that have been printed and the reading of the print data are not executed at the same time, the reading and writing control unit 104 may prevent a reduction in the reading speed of the print data of the reading unit 103, thereby suppressing prolongation of the time required for a plurality of printing.

The state in which the reading unit 103 is not reading the print data is the state of the printer 1 corresponding to at least one of the state related to a cleaning operation for sucking ink from the nozzle and the state related to the replacement of media M (rolled paper) attachable and detachable to the printer 1.

In this configuration, since, in a case where the state of the printer 1 corresponds to at least one of the state related to the cleaning operation and the state related to the replacement of the media M, the print data that have been printed is erased from the printing SSD 112, it is possible to efficiently execute erasing of the print data that have been printed by using the unprinted state generated at predetermined intervals while suppressing prolongation of the time required for a plurality of printing.

Until the writing unit 102 is instructed to start writing new print data, the reading and writing control unit 104 erases the print data that have been printed from the printing SSD 112 in a case where a Trim command (erase command) instructing to erase print data from the printing SSD 112 is received. In a case where the writing unit 102 starts writing new print data and the size of the new print data is smaller than the free capacity of the printing SSD 112, the reading and writing control unit 104 causes the writing unit 102 to write new print data without executing erasing of the print data that have been printed from the printing SSD 112.

In this configuration, since, in advance, the reading and writing control unit 104 provides a free capacity equal to the size of the new print data in the printing SSD 112, the writing of the new print data is promptly enabled, thereby suppressing prolongation of the time required for a plurality of printing.

The printer control apparatus 10 includes a measuring unit 106 that measures the cumulative amount of print data written in the printing SSD 112, and a reporting unit 107 that reports the information. In a case where the cumulative amount measured by the measuring unit 106 is equal to or more than the amount of fragmentation generation (a predetermined amount), the reporting unit 107 reports the information on the reduction in the printing speed of the printer 1 by displaying it on the display unit 13.

In this configuration, since, in a case where the cumulative amount measured by the measuring unit 106 is equal to or more than the amount of fragment generation, information on a reduction in the printing speed of the printer 1 is reported, a user may recognize a reduction in the printing speed which may be caused by writing to printing SSD112.

The printer control apparatus 10 includes an eliminating unit 108 that eliminates fragmentation of the printing SSD 112. In a case where the cumulative amount measured by the measuring unit 106 is equal to or more than the amount of the fragmentation generation, the reporting unit 107 reports information on fragmentation. In a case where the user issues an instruction to eliminate fragmentation, the eliminating unit 108 eliminates fragmentation of the printing SSD 112.

In this configuration, since, in a case where a cumulative amount measured by the measuring unit 106 is equal to or more than the amount of fragmentation generation, information on fragmentation is reported, the user may recognize fragmentation that may be generated in the printing SSD 112. Since the reporting unit 107 reports information on the fragmentation along with information on the printing speed, the user may recognize fragmentation that may be generated in the printing SSD 112, as a factor of the reduction in the printing speed. In this configuration, since, in the case where the user issues an instruction to eliminate fragmentation, fragmentation of the printing SSD 112 is eliminated, it is possible to eliminate a reduction in the reading speed of print data caused by fragmentation.

The value of n indicating the number of cells constituting a page is a value of data size at which reading and writing are executable from the printing SSD112, and which is equal to or more than 8 Kbytes and less than 16 Kbytes.

Generally, it is known that, in the hard disk, reading and writing are executed in a unit, called a sector, and the data size that may be read from the sector is about 4 Kbytes. As described above, in a case where the printer 1 temporarily stops the printing operation, there is a possibility that the printing quality deteriorates. Therefore, the larger the size of the print data that may be read by the reading unit 103 at a time, the lower the possibility that the printing operation of the printer 1 temporarily stops. Therefore, in the embodiment, since the printing SSD 112 is set to a target to read the print data, it is possible to read the print data more promptly than the hard disk, and thus it is possible to suppress prolongation of the time required for a plurality of printing caused by the fact that the reading of the print data required for printing does not be completed in time.

There is provided the printer control apparatus 10 on the printer 1, including the printer unit 3 executing printing based on the print data.

In this configuration, even if the printer control apparatus 10 is provided on the printer 1, it is possible to control erasing of the print data that have been printed efficiently from the printing SSD 112, thereby suppressing prolongation of the time required for a plurality of printing.

Each of the above-described embodiments merely shows one embodiment of the invention, and any modification and application are possible within the scope of the invention.

For example, in the above-described embodiments, the configuration in which the printer control apparatus 10 is provided on the printer 1 has been illustrated, but the printer control apparatus 10 may be provided separately from the printer 1 and provided outside. In this case, the printer control apparatus 10 functions as an external apparatus that expertly executes generation of print data.

For example, in the above-described embodiments, there are illustrated the line type ink jet heads 51 and 52 as the print head, but there may be used a serial type ink jet head which is mounted on the carriage and scans in the direction intersecting the transport direction H of the media M.

The function of each function block described above in the printer control unit 100 may be realized in the form of a storage medium that stores a program, a server apparatus that distributes the program, a transmission medium that transmits the program, and a data signal or the like in which the program is implemented on the carrier wave. As a storage medium, various kinds of computer-readable media may be used, either a magnetic or optical storage medium or a semiconductor memory device may be used, and other kinds of storage media may be used. The storage medium may be a portable storage medium such as a memory card. The storage medium may be a storage medium provided in an apparatus connected to the apparatus through a communication line. The program may be implemented as a stand-alone application program operating on an operating system in an apparatus with the operating system implemented thereon. The program is not limited to the stand-alone application program, but may be implemented as a plurality of functions among an operating system, a device driver, and an application program. For example, the program may be configured such that a device driver program for controlling an operation device having an operation surface and/or a program module for accepting an operation on an operation device in an operating system cooperates to realize the program. The program of the invention may be configured to be realized by a plurality of application programs, and a specific program form is optional.

For example, in a case where the control method (the control method of the printing control apparatus) of the above-described printer control apparatus 10 is realized using a computer provided in the printer control apparatus 10, the invention may be configured in the form of a program executed by a computer to realize the control method, a recording medium in which the program is recorded so as to be readable by the computer, or a transmission medium that transmits this program. As the recording medium, a magnetic or optical recording medium or a semiconductor memory device may be used. More specifically, the recording medium includes a portable medium such as a flexible disk, a Hard Disk Drive (HDD), a Compact Disk Read Only Memory (CD-ROM), a Digital Versatile Disk (DVD), a Blu-ray (registered trademark) Disc, a magneto-optical disk, a flash memory, a card type recording medium or the like, or a fixed type recording medium. The recording medium may be a nonvolatile storage apparatus such as a Random Access Memory (RAM), a Read Only Memory (ROM), an HDD or the like which is an internal storage apparatus provided in the printer control apparatus 10.

For example, processing units of processing in FIG. 3 and FIGS. 6A to 6C are divided according to main processing contents in order to make the processing of the printer control apparatus 10 easy to understand, and the invention is not limited depending on how to divide the processing units and names. The processing of the printer control apparatus 10 may be divided into many processing units depending on processing contents. The processing may be divided such that one processing unit includes more processing.

Each functional unit shown in FIG. 2 indicates a functional configuration, and a specific implementation form is not particularly limited. That is, it is not always necessary to implement hardware corresponding to each functional unit individually, but it is also possible to realize functions of a plurality of functional units by executing a program by one processor. Some of the functions realized by software in the above-described embodiments may be implemented by hardware, or a portion of functions realized by hardware may be realized by software. Besides, specific detailed configurations of the printer 1 and other units of the printer control apparatus 10 may be optionally modified without departing from the spirit of the invention.

For example, in the above-described embodiments, the printer 1 is illustrated as an ink jet printer including the ink jet head 51 and the ink jet head 52. However, in the printer 1, the printing format is not limited to the ink jet format, and the invention may be applied to other printing formats. In the case where the invention is applied to the printer 1 in the format other than the ink jet format, the state related to the cleaning operation is not included in the unprinted state of the printer 1.

The entire disclosure of Japanese Patent Application No: 2017-146228, filed Jul. 28, 2017, is expressly incorporated by reference herein in its entirety.

What is claimed is:

1. A printing control apparatus that controls a printing apparatus executing printing based on print data, comprising:
    a storage unit having a nonvolatile memory in which reading and writing are executed in n cell units (n is 2 or more);
    a writing unit that writes the print data to the nonvolatile memory;
    a reading unit that reads the print data from the nonvolatile memory;
    a measuring unit that measures a cumulative amount of the print data written in the nonvolatile memory;
    a reporting unit that reports information; and
    a control unit that controls erasing of the print data that have been printed from the nonvolatile memory according to a read state of the reading unit and causes the writing unit to write new print data,
    wherein the reporting unit reports information on a reduction in a printing speed of the printing apparatus in a case where the cumulative amount measured by the measuring unit is equal to or more than a predetermined amount.

2. The printing control apparatus according to claim 1, wherein the control unit, erases the print data that have been printed from the nonvolatile memory and causes the writing unit to write new print data in a case where the reading unit is in a state where the reading unit is not reading print data.

3. The printing control apparatus according to claim 2, wherein a state in which the reading unit is not reading the print data is at least one of a state related to a cleaning operation in which the printing apparatus sucks ink from a nozzle and a state related to a replacement of a rolled paper attachable and detachable to the printing apparatus.

4. The printing control apparatus according to claim 1, wherein the control unit, does not to start erasing the print data that have been printed from the nonvolatile memory in a case where the reading unit is in a state where the reading unit is reading the print data.

5. The printing control apparatus according to claim 1, wherein the control unit, erases print data that have been printed from the nonvolatile memory in a case where an erase command instructing to erase the print data from the nonvolatile memory is received until the writing unit is instructed to start writing the new print data, and causes the writing unit to write the new print data without executing erasing of the print data that have been printed from the nonvolatile memory in a case where the writing unit starts writing new print data and the size of the new print data is smaller than a free capacity of the nonvolatile memory.

6. The printing control apparatus according to claim 1, further comprising: an eliminating unit that eliminates fragmentation of the nonvolatile memory,
    wherein the reporting unit reports information on fragmentation in a case where the cumulative amount measured by the measuring unit is equal to or more than a predetermined amount, and
    the eliminating unit eliminates the fragmentation of the nonvolatile memory in a case where a user issues an instruction to eliminate fragmentation.

7. The printing control apparatus according to claim 1, wherein the value of n is a value of a data size at which reading and writing are executable from the nonvolatile memory and which is equal to or more than 8 Kbytes and less than 16 Kbytes.

8. The printing control apparatus according to claim 1, wherein the printing control apparatus is provided in the printing apparatus including a printer unit executing printing based on the print data.

9. A control method of a printing control apparatus that controls a printing apparatus executing printing based on the print data, the printing control apparatus including a storage unit having a nonvolatile memory in which reading and writing are executed in n cell units (n is 2 or more), a writing unit that writes print data to the nonvolatile memory, and a reading unit that reads the print data from the nonvolatile memory, a measuring unit that measures a cumulative amount of the print data written in the nonvolatile memory, and a reporting unit that reports information, the method comprising:
    controlling erasing of the print data that have been printed from the nonvolatile memory according to a read state of the reading unit, and causing the writing unit to write new print data,
    wherein the reporting unit reports information on a reduction in a printing speed of the printing apparatus in a case where the cumulative amount measured by the measuring unit is equal to or more than a predetermined amount.

10. A printing apparatus comprising a printing control apparatus that controls the printing apparatus executing printing based on print data, the printing control apparatus including a storage unit having a nonvolatile memory in which reading and writing are executed in n cell units (n is 2 or more), a writing unit that writes print data to the nonvolatile memory, a reading unit that reads the print data from the nonvolatile memory, a measuring unit that measures a cumulative amount of the print data written in the nonvolatile memory, a reporting unit that reports information, and a control unit, the control unit including a processor and non-transitory system memory having computer executable instructions stored thereon that, when executed by the processor, cause the control unit to:
    control erasing of the print data that have been printed from the nonvolatile memory according to a read state of the reading unit, and causes the writing unit to write new print data,
    wherein the reporting unit reports information on a reduction in a printing speed of the printing apparatus in a case where the cumulative amount measured by the measuring unit is equal to or more than a predetermined amount.

* * * * *